United States Patent
Kimura

(10) Patent No.: US 9,824,496 B2
(45) Date of Patent: Nov. 21, 2017

(54) INFORMATION DISPLAY SYSTEM USING HEAD MOUNTED DISPLAY DEVICE, INFORMATION DISPLAY METHOD USING HEAD MOUNTED DISPLAY DEVICE, AND HEAD MOUNTED DISPLAY DEVICE

(71) Applicant: Seiko Epson Corporation, Tokyo (JP)

(72) Inventor: Fusashi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 14/185,692

(22) Filed: Feb. 20, 2014

(65) Prior Publication Data
US 2014/0285521 A1 Sep. 25, 2014

(30) Foreign Application Priority Data
Mar. 22, 2013 (JP) .................................. 2013-059623

(51) Int. Cl.
| | |
|---|---|
| G06T 19/00 | (2011.01) |
| G02B 27/01 | (2006.01) |
| G06F 3/01 | (2006.01) |
| G06F 3/147 | (2006.01) |
| H04L 1/00 | (2006.01) |

(52) U.S. Cl.
CPC .......... *G06T 19/006* (2013.01); *G02B 27/017* (2013.01); *G06F 3/011* (2013.01); *G06F 3/147* (2013.01); *G02B 27/01* (2013.01); *G02B 27/0101* (2013.01); *G02B 2027/014* (2013.01); *G02B 2027/0178* (2013.01); *G06F 3/012* (2013.01); *H04L 1/00* (2013.01)

(58) Field of Classification Search
None
See application file for complete search history.

(56) References Cited

U.S. PATENT DOCUMENTS

2002/0091947 A1* 7/2002 Nakamura .............. G06F 21/31
  726/17
2011/0157005 A1 6/2011 Inoue
(Continued)

FOREIGN PATENT DOCUMENTS

| EP | 0877353 A | 11/1998 |
| JP | 10-307698 A | 11/1998 |

(Continued)

*Primary Examiner* — Mark Zimmerman
*Assistant Examiner* — Yu-Jang Tswei
(74) *Attorney, Agent, or Firm* — ALG Intellectual Property, LLC

(57) ABSTRACT

In an information display system, an information apparatus includes a target information storage section that stores target information to be published by the information apparatus and an extraction section that extracts the target information from the target information storage section on the basis of user information that is information regarding a user of a head mounted display device, and the head mounted display device includes an information generating section that generates information for additional presentation for providing the augmented reality to the user using the target information acquired from the information apparatus and an image display section that enables the user to view the generated information for additional presentation as a virtual image.

10 Claims, 14 Drawing Sheets

(56) References Cited

U.S. PATENT DOCUMENTS

| | | | |
|---|---|---|---|
| 2011/0249122 A1* | 10/2011 | Tricoukes | G02B 27/017 348/158 |
| 2011/0302662 A1* | 12/2011 | Kannari | G06Q 20/1235 726/29 |
| 2012/0056899 A1* | 3/2012 | Stroila | G01C 21/32 345/634 |
| 2012/0210254 A1* | 8/2012 | Fukuchi | G06F 3/012 715/757 |
| 2013/0174213 A1* | 7/2013 | Liu | G02B 27/017 726/1 |
| 2014/0125574 A1* | 5/2014 | Scavezze | G06F 21/31 345/156 |

FOREIGN PATENT DOCUMENTS

| | | |
|---|---|---|
| JP | 2006-099227 A | 4/2006 |
| JP | 2011-134054 A | 7/2011 |
| JP | 2012-053629 A | 3/2012 |
| JP | 2012-118882 A | 6/2012 |

\* cited by examiner

| | TAG INFORMATION | | EXTRACTION PERMISSION CONDITIONS |
|---|---|---|---|
| IDENTI-FIER | TAG | POSITION INFORMATION | |
| T1 — 001 | TEXT FILE A | XX. XXXX XXX. XXXX | 2013/2/21 TO 2013/2/26 |
| T2 — 002 | TEXT FILE B | XX. XXXX XXX. XXXX | WHEN USER INFORMATION IS "XXX" |
| T3 — 003 | AUDIO FILE A | XX. XXXX XXX. XXXX | ALL |
| T4 — 004 | IMAGE FILE A | XX. XXXX XXX. XXXX | ALL |
| T5 — 005 | TEXT FILE C | XX. XXXX XXX. XXXX | ALL |
| T6 — 006 | AUDIO FILE B | XX. XXXX XXX. XXXX | WHEN USER INFORMATION IS "XXXXX" |
| T7 — 007 | IMAGE FILE B | XX. XXXX XXX. XXXX | ALL |
| T8 — 008 | IMAGE FILE C | XX. XXXX XXX. XXXX | EVERYDAY, 21:00 TO 24:00 |
| T9 — 009 | VIDEO FILE A | XX. XXXX XXX. XXXX | 2013/2/28, 9:00 TO 18:00 |
| T10 — 010 | APPLICATION DATA FILE A | XX. XXXX XXX. XXXX | WHEN PASSWORD (USER INFORMATION) IS "XXXX" |
| ⋮ | ⋮ | ⋮ | ⋮ |

| LIMITED AREA INFORMATION | UPDATE PERMISSION CONDITIONS |
|---|---|
| C1: XX.XXXX– XX.XXXX<br>XXX.XXXX– XXX.XXXX | WHEN USER INFORMATION IS "XXXXX" |
| C2: XX.XXXX– XX.XXXX<br>XXX.XXXX– XXX.XXXX | NOT ALLOWED |
| C3: XX.XXXX– XX.XXXX<br>XXX.XXXX– XXX.XXXX | 2013/4/2, 10:00 TO 12:00 |
| C4: XX.XXXX– XX.XXXX<br>XXX.XXXX– XXX.XXXX | EVERYDAY, 9:00 TO 18:00 |
| C5: XX.XXXX– XX.XXXX<br>XXX.XXXX– XXX.XXXX | NOT ALLOWED |
| C6: XX.XXXX– XX.XXXX<br>XXX.XXXX– XXX.XXXX | WHEN PASSWORD (USER INFORMATION) IS "XXX" |
| C7: XX.XXXX– XX.XXXX<br>XXX.XXXX– XXX.XXXX | 2013/3/1 TO 2013/3/15 |

| IDENTI-FIER | TAG INFORMATION | | EXTRACTION PERMISSION CONDITIONS | DEGREE OF IMPORTANCE |
|---|---|---|---|---|
| | TAG | POSITION INFORMATION | | |
| T1 — 001 | TEXT FILE A | XX. XXXX<br>XXX. XXXX | 2013/2/21 TO 2013/2/26 | HIGH |
| T2 — 002 | TEXT FILE B | XX. XXXX<br>XXX. XXXX | WHEN USER INFORMATION IS "XXX" | MEDIUM |
| T3 — 003 | AUDIO FILE A | XX. XXXX<br>XXX. XXXX | ALL | URGENT |

| IDENTI-FIER | TAG INFORMATION | | EXTRACTION PERMISSION CONDITIONS | AGREEMENT NUMBER |
|---|---|---|---|---|
| | TAG | POSITION INFORMATION | | |
| T1 — 001 | TEXT FILE A | XX. XXXX<br>XXX. XXXX | 2013/2/21 TO 2013/2/26 | 8 |
| T2 — 002 | TEXT FILE B | XX. XXXX<br>XXX. XXXX | WHEN USER INFORMATION IS "XXX" | 15 |
| T3 — 003 | AUDIO FILE A | XX. XXXX<br>XXX. XXXX | ALL | 243 |

352

INFORMATION DISPLAY SYSTEM USING HEAD MOUNTED DISPLAY DEVICE, INFORMATION DISPLAY METHOD USING HEAD MOUNTED DISPLAY DEVICE, AND HEAD MOUNTED DISPLAY DEVICE

BACKGROUND

1. Technical Field

The present invention relates to an information display system using a head mounted display device.

2. Related Art

A head mounted display device that is mounted on the head of an observer to form a virtual image on the viewing area of the observer is known (for example, refer to JP-A-10-307698 and JP-A-2011-134054). The head mounted display device is also referred to as a head mounted display (HMD), and there are a non-transmissive head mounted display device that blocks the field of view of the user in a state where the user wears the head mounted display device and a transmissive head mounted display device that does not block the field of view of the user in a state where the user wears the head mounted display device.

On the other hand, a technique called augmented reality (AR) that presents additional information for the real environment using a computer is known. As methods of realizing the augmented reality, a method using image recognition and a method based on a pass-through method are known. In the method using image recognition, information for additional presentation is generated by performing image recognition of an image of the outside scene captured by a WEB camera, for example. In the method based on a pass-through method, information for additional presentation is generated using current position information acquired by the GPS and azimuth information acquired by the electronic compass, for example. In the non-transmissive head mounted display device, an image in which the image of the outside scene and the information for additional presentation generated as described above are superimposed is displayed on the liquid crystal display. Therefore, the user can feel the augmented reality. In the transmissive head mounted display device, only the information for additional presentation generated as described above is displayed on the liquid crystal display. The user can feel the augmented reality by viewing both the information for additional presentation, which is displayed as a virtual image through the liquid crystal display, and the actual outside scene, which is viewed through the lens in front of the eyes.

In recent years, a social networking service (SNS) using such augmented reality has become known. The social networking service using the augmented reality will also be referred to as "AR-SNS service" hereinafter. A server that provides the AR-SNS service has a storage unit that stores tags (text, images, and the like to be published) transmitted from various client apparatuses. The client apparatus of the AR-SNS service transmits information that can specify the current position of the user and the direction of the user (specifically, an image of the outside scene or current position information and azimuth information) to the server. The server extracts a tag corresponding to the current position from the storage unit on the basis of the information received from the client apparatus, and transmits the tag to the client apparatus. The client apparatus generates and displays information for additional presentation using the tag received from the server.

In the information display system providing the AR-SNS service described above, there has been a demand to set limits on the publication of information in order to publish the tag only to the specific users. In addition, in the information display system that provides the above AR-SNS services, both good and bad content are included in the content of tags that are transmitted from various users and are stored in a server, and content such as insult is also included therein. There has been a problem that the tag of the type of insult makes other users uncomfortable who unintentionally view the tag or results in damages to a specific person, a specific store, or the like. For this reason, there has been a demand to set limits on the accumulation of information in the information display system.

SUMMARY

An advantage of some aspects of the invention is to solve at least apart of the problems described above, and the invention can be implemented as the following aspects.

(1) An aspect of the invention is directed to an information display system including: an information apparatus; and a head mounted display device that enables a user to view a virtual image. In the information display system, the information apparatus includes a target information storage section that stores target information to be published by the information apparatus, an extraction section that extracts the target information from the target information storage section on the basis of user information that is information regarding the user of the head mounted display device, and a transmission section that transmits the extracted target information to the head mounted display device. The head mounted display device includes an information acquisition section that transmits the user information to the information apparatus and acquires the target information from the information apparatus, an information generating section that generates information for additional presentation for providing the augmented reality to the user using the acquired target information, and an image display section that enables the user to view the generated information for additional presentation as the virtual image. In the information display system according to the aspect of the invention, the information apparatus extracts the target information from the target information storage section on the basis of the user information that is the information regarding the user of the head mounted display device and transmits the extracted target information to the head mounted display device. Then, the head mounted display device generates the information for additional presentation using the acquired target information and makes the generated information for additional presentation be viewed as a virtual image by the user. Therefore, by using the user information, it is possible to set limits on the publication of information in the information display system that provides the AR-SNS service.

(2) In the information display system according to the aspect of the invention, extraction permission conditions that are conditions when extracting the target information may be stored in the target information storage section so as to match the target information, and the extraction section may extract the target information when the user information received from the head mounted display device satisfies the extraction permission conditions. In the information display system according to this configuration, the extraction section of the information apparatus can publish target information only for the user of the head mounted display device that transmits the user information satisfying the extraction permission conditions. In addition, since the extraction permission conditions are stored in the target information storage section of the information apparatus so as to match the target information, it is possible to set limits on the publication in detail for each piece of target information.

(3) In the information display system according to the aspect of the invention, at least one of an account name set by the user, authentication information set by the user, an e-mail address of the user, a network address of the head mounted display device, a MAC address of the head mounted display device, an account name provided from a provider of a service used by the user, and authentication information provided from the provider of the service used by the user may be included in the user information. In the information display system according to this configuration, the extraction section of the information apparatus can extract the target information from the target information storage section on the basis of various kinds of user information.

(4) In the information display system according to the aspect of the invention, in the information apparatus, order information for determining a display order of the target information may be further stored in the target information storage section so as to match the target information, the extraction section may extract the order information from the target information storage section together with the target information, and the transmission section may transmit the extracted target information and the extracted order information to the head mounted display device. The information generating section of the head mounted display device may generate the information for additional presentation by superimposing the target information in order according to the order information when a plurality of pieces of the target information are received. In the information display system according to this configuration, the information apparatus transmits the order information for determining the display order of the target information to the head mounted display device together with the target information. When a plurality of pieces of target information are received, the head mounted display device generates information for additional presentation by superimposing the target information in the order according to the order information. Thus, when transmitting a plurality of pieces of target information to the head mounted display device, the information apparatus can specify which target information is to be displayed in a top layer in the information for additional presentation, that is, which target information is made to be easily viewed by the user, using the order information.

(5) In the information display system according to the aspect of the invention, the information apparatus may further include: an update permission condition storage section that stores update permission conditions for allowing updating of the target information storage section; and an update section that, when received information that has been received from the head mounted display device satisfies the update permission conditions, updates the target information storage section using the received information. The head mounted display device may further include an update request section that transmits information for updating the target information storage section to the information apparatus. In the information display system according to this configuration, when the received information that has been received from the head mounted display device satisfies the update permission conditions, the update section of the information apparatus updates the target information storage section using the received information. Therefore, information accumulated in the target information storage section can be limited to information satisfying the update permission conditions. As a result, it is possible to set limits on the accumulation of information in the information display system that provides the AR-SNS service.

(6) In the information display system according to the aspect of the invention, in the information apparatus, the limited area information specifying a limited area to limit updating of the target information storage section may be stored in the update permission condition storage section of the information apparatus so as to match the update permission conditions, and the update section may acquire the limited area information corresponding to current position information of the head mounted display device, which is included in the received information, and update the target information storage section using the received information when the received information satisfies the update permission conditions matched with the acquired limited area information. The update request section of the head mounted display device may transmit the current position information indicating a current position of the head mounted display device together with information for updating the target information storage section. In the information display system according to this configuration, the limited area information specifying the limited area to limit updating of the target information storage section is stored in the update permission condition storage section of the information apparatus so as to match the update permission conditions. Therefore, the update section of the information apparatus can apply the update permission conditions for each limited area. As a result, it is possible to set limits on the accumulation of information in detail for each limited area in the information display system that provides the AR-SNS service.

(7) In the information display system according to the aspect of the invention, at least one of conditions specifying the user for whom updating of the target information storage section is allowed, conditions specifying update date and time of the target information storage section, and conditions indicating that updating of the target information storage section is not allowed may be included in the update permission conditions. In the information display system according to this configuration, the update section of the information apparatus can limit the accumulation of information into the target information storage section in units of a "user" using the conditions specifying a user for whom updating of the target information storage section is allowed. In addition, the update section of the information apparatus can limit the accumulation of information into the target information storage section in units of "date and time" using the conditions specifying the update date and time of the target information storage section. In addition, the update section of the information apparatus can limit all the accumulation of information into the target information storage section using the conditions indicating that the updating of the target information storage section is not allowed.

(8) Another aspect of the invention is directed to a head mounted display device that enables a user to view a virtual image. The head mounted display device includes: an information acquisition section that acquires target information that is information extracted on the basis of user information that is information regarding the user of the head mounted display device; an information generating section that generates information for additional presentation for providing the augmented reality to the user using the acquired target information; and an image display section that enables the user to view the generated information for additional presentation as the virtual image. In the head mounted display device according to this configuration, it is possible to acquire the target information that is information extracted on the basis of the user information that is information regarding the user of the head mounted display device, generate the information for additional presentation for providing the augmented reality to the user using the acquired target information, and make the generated information for additional presentation be viewed as a virtual image by the user. As a result, it is possible to set limits on the publication of information in the head mounted display device that is a client apparatus of the AR-SNS service.

(9) Still another aspect of the invention is directed to a head mounted display device that enables a user to view a virtual image. The head mounted display device includes: a target information storage section that stores target information to be published by the head mounted display device; an extraction section that extracts the target information from the target information storage section on the basis of user information that is information regarding the user; an information generating section that generates information for additional presentation for providing the augmented reality to the user using the extracted target information; and an image display section that enables the user to view the generated information for additional presentation as the virtual image. In the head mounted display device according to this configuration, it is possible to provide a head mounted display device that provides the AR-SNS service in which the publication of information is limited.

All of the plurality of components in each aspect of the invention described above are not essential, and some of the plurality of components can be changed, removed, or replaced with new components and a part of the limited content may be deleted in order to solve some or all of the problems described above or in order to achieve some or all of the effects described in this specification. In addition, in order to solve some or all of the problems described above or in order to achieve some or all of the effects described in this specification, some or all of the technical features in an aspect of the invention described above may be combined with some or all of the technical features in the other aspects of the invention described above and the result may also be applied as an independent form of the invention.

For example, one form of the invention can be realized as a system including some or all of six components of the target information storage section, the extraction section, the transmission section, the information acquisition section, the information generating section, and the image display section. That is, this system may include or may not include the target information storage section. In addition, this system may include or may not include the extraction section. In addition, this system may include or may not include the transmission section. In addition, this system may include or may not include the information acquisition section. In addition, this system may include or may not include the information generating section. In addition, this system may include or may not include the image display section. Although such a system can be realized as, for example, an information display system including an information apparatus and a head mounted display device, the system can also be realized in various forms (for example, a form of a head mounted display device alone and a form of an information apparatus alone) other than the information display system. Some or all of the technical features described above can be applied to the apparatus of each form.

In addition, the invention can be implemented in various forms. For example, the invention can be realized as an information display system, an information display method, an information apparatus, a head mounted display device, a computer program for realizing the functions of these apparatus, method, and system, and a recording medium having the computer program recorded therein.

BRIEF DESCRIPTION OF THE DRAWINGS

The invention will be described with reference to the accompanying drawings, wherein like numbers reference like elements.

FIG. 2 is an explanatory view showing an example of a tag table.

FIG. 3 is an explanatory view showing an example of an update condition table.

FIGS. 10A and 10B are explanatory views showing other examples of the tag table.

DESCRIPTION OF EXEMPLARY EMBODIMENTS

A. First Embodiment

A-1. Configuration of an Information Display System

Figure 1:
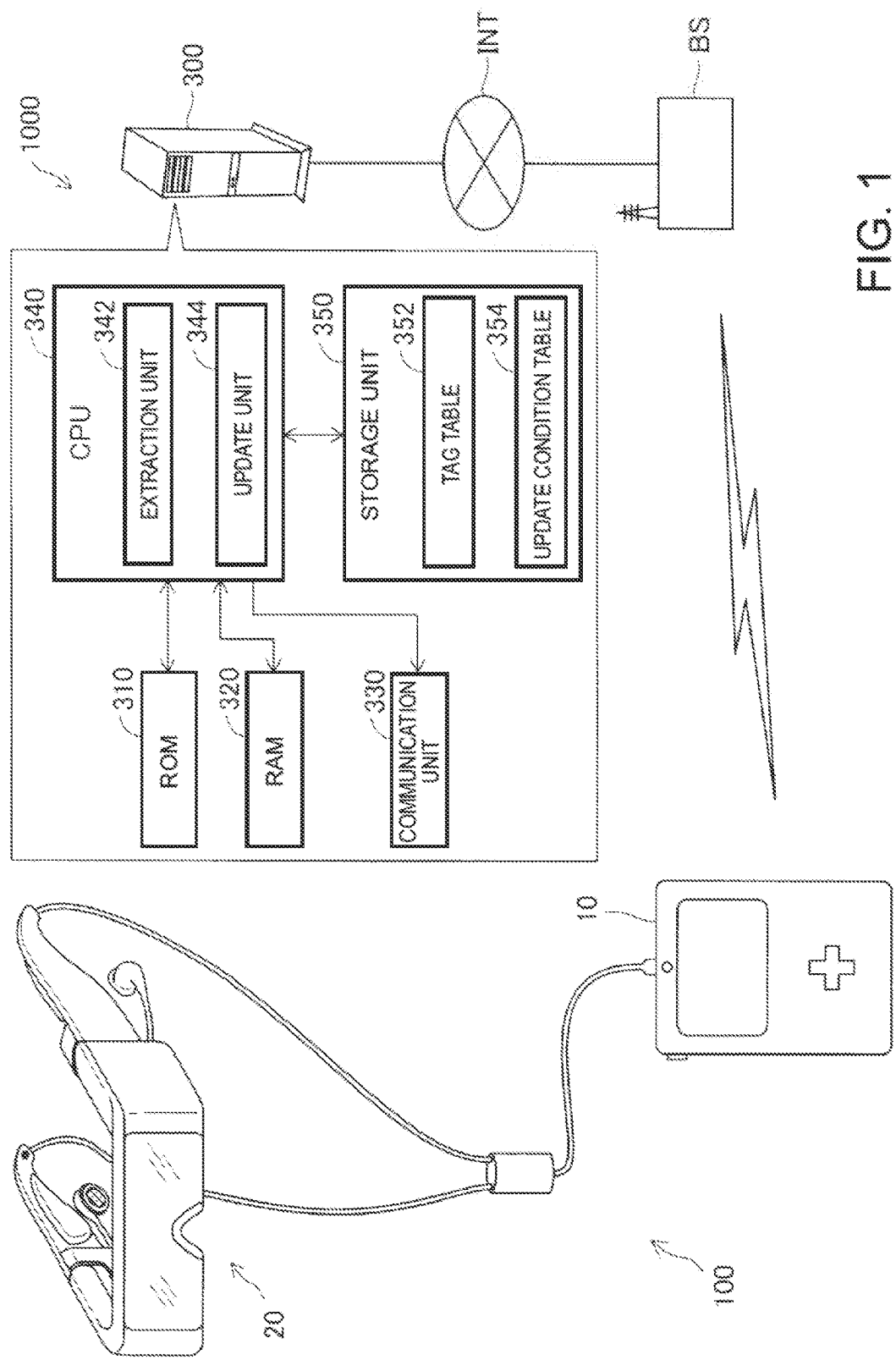
FIG. 1 is an explanatory view showing the schematic configuration of an information display system according to an embodiment of the invention.

FIG. 1 is an explanatory view showing the schematic configuration of an information display system according to an embodiment of the invention. An information display system 1000 includes a head mounted display device 100 and a server 300. The head mounted display device 100 is a display device mounted on the head, and is also referred to as a head mounted display (HMD). The head mounted display 100 of the present embodiment is an optical transmission type head mounted display device that enables a user to view the outside scene directly while viewing a virtual image. The server 300 is an apparatus that provides the head mounted display 100 with the social networking service (SNS) using the augmented reality (AR). The social networking service using the augmented reality is also referred to as "AR-SNS service" hereinafter. In addition, the server 300 is equivalent to an "information apparatus" in the appended claims.

The head mounted display 100 is connected to the Internet INT through a communication carrier BS by wireless communication. The server 300 is connected to the Internet INT by cable communication. As a result, the server 300 and the head mounted display 100 are connected to each other through the Internet INT. The communication carrier BS includes a transceiver antenna, a wireless base station, and a switching center.

The server 300 that provides the AR-SNS service has a storage unit that stores tag information (information in which tags such as a text or images to be published are matched with position information associated with the tags) transmitted from various client apparatuses. The client apparatus means an apparatus that is a client of the AR-SNS service provided by the server 300. In addition to the head mounted display 100 shown in FIG. 1, for example, there is a personal computer or a smartphone. Hereinafter, a case where the head mounted display 100 is used as a client apparatus will be described.

The head mounted display 100 as a client apparatus transmits information, which can specify the current position of the user and the direction of the user, to the server 300. Specifically, the information that can specify the current position of the user and the direction of the user is an image of the outside scene or current position information and azimuth information. The server 300 extracts a tag matched with the current position from the storage unit on the basis of the information received from the head mounted display 100, and transmits the tag to the head mounted display 100. The head mounted display 100 generates and displays information for additional presentation using the tag received from the server 300. As a result, the user of the head mounted display 100 can view the tag corresponding to the current position thereof as a virtual image.

A-2. Configuration of an Information Apparatus (Server)

The server 300 includes a ROM 310, a RAM 320, a communication unit 330, a CPU 340, and a storage unit 350. The respective units provided in the server 300 are connected to each other by a bus. The communication unit 330 communicates with other devices, such as the head mounted display 100, through the Internet INT. The CPU 340 functions as an extraction unit 342 and an update unit 344 by loading a computer program stored in the ROM 310 or the storage unit 350 to the RAM 320 and then executing the computer program.

The extraction unit 342 is a main control unit of a limited publication process. The limited publication process is a process when the extraction unit 342 extracts a tag from a storage section (tag table 352) that stores tag information and displays the extracted tag on the head mounted display 100. The update unit 344 is a main control unit of a limited update process. The limited update process is a process of receiving information transmitted from the head mounted display 100 and updating the storage section (tag table 352), which stores the tag information, using the received information when the received information satisfies the conditions.

The storage unit 350 is formed by a ROM, a RAM, a DRAM, and a hard disk, for example. The tag table 352 and an update condition table 354 are stored in the storage unit 350.

FIG. 2 is an explanatory view showing an example of the tag table 352. The tag table 352 is a storage section for storing (accumulating) information to be published by the server 300. The tag table 352 includes an identifier, a tag, position information, and extraction permission conditions. Information for identifying a tag uniquely is stored in the identifier.

Information to be published in the AR-SNS service is stored in the tag. Examples of the information to be published include a text file, an application data file, an image file including a still image and a video image, and an audio file. The text file is a file in which data expressed by character codes, such as a character, is included. The application data file is a file in which data created by arbitrary software (application), such as document creation software, is included. The image file is a file in which data of a still image or a video image is included. The audio file is a file in which audio data is included. In the present embodiment, the content expressed by the text file, the application data file, the image file, and the audio file described above is also referred to as a "tag". In addition, the file itself may be stored in a tag, or a file path indicating the location where the file is stored in the storage unit 350 of the server 300 may be stored in a tag.

Information for specifying the position in the real world where the tag is associated is stored in the position information. In the present embodiment, the position in the real world is specified by the combination of latitude and longitude.

Conditions used when the extraction unit 342 extracts a tag in the limited publication process (in other words, conditions used to allow the publication of a tag) are stored in the extraction permission conditions. In the present embodiment, conditions specifying the user for whom publication of a tag is allowed and conditions specifying the publication date and time of a tag are included in the extraction permission conditions. As the conditions specifying the user for whom publication of a tag is allowed, for example, there are conditions (tag information T2 and T6) specifying the content of user information and conditions (authentication information) specifying the content of the password (tag information T10). In addition, the user information is information regarding the user of the head mounted display 100. As the conditions specifying the publication date and time of a tag, for example, there are conditions (tag information T1) specifying the range of publication start date and publication end date of a tag, conditions (tag information T8) specifying the range of publication start time and publication end time of a tag, and conditions (tag information T9) specifying both the publication date and the publication time of a tag. In addition, in the example shown in FIG. 2, conditions (tag information T3 to T5 and T7) indicating that the publication of a tag is allowed without limit (in other words, in all date and time for all users) are also included in the extraction permission conditions.

In addition, an identifier, a tag, and position information are also referred to collectively as "tag information". The tag is equivalent to "target information" in the appended claims, and the tag table 352 is equivalent to a "target information storage section" in the appended claims.

In the example shown in FIG. 2, from the tag information T1, it can be seen that a tag expressed by the identifier 001 and the text file A is associated with a position specified by latitude XX. XXXX and longitude XXX. XXXX in the real world. In addition, it can be seen that the publication of the tag of the tag information T1 is allowed until Feb. 26, 2013 from Feb. 21, 2013. Similarly, from the tag information T2, it can be seen that a tag expressed by the identifier 002 and the text file B is associated with a position specified by latitude XX. XXXX and longitude XXX. XXXX in the real world. In addition, it can be seen that the publication of the tag of the tag information T2 is allowed when the user information for identifying the user of the head mounted display 100 is "XXX". Similarly, from the tag information T3, it can be seen that a tag expressed by the identifier 003 and the audio file A is associated with a position specified by latitude XX. XXXX and longitude XXX. XXXX in the real world. In addition, it can be seen that the publication of the tag of the tag information T3 is allowed without limit. In addition, in FIG. 2, latitude and longitude (position information) of the tag information T1 to T10 and a character string, which forms user information or a password, are expressed using "X". In FIG. 2, "X" means an arbitrary character string, and different character strings are inserted in practice.

FIG. 3 is an explanatory view showing an example of the update condition table 354. The update condition table 354 is a storage section that stores update permission conditions to allow the updating of the tag table 352. The update condition table 354 includes limited area information and update permission conditions.

Information specifying the limited area to limit the updating of the tag table 352 in the real world is stored in the limited area information. In the present embodiment, a region in the real world is specified by the combination of the range-specified latitude and the range-specified longitude.

The conditions used when the update unit 344 allows the updating of the tag table 352 in the limited update process are stored in the update permission conditions. In the present embodiment, conditions specifying a user for whom updating of the tag table 352 is allowed, conditions specifying the update date and time of the tag table 352, and conditions indicating that updating of the tag table 352 is not allowed are included in the update permission conditions. As the conditions specifying a user for whom updating of the tag table 352 is allowed, for example, there are conditions (conditions C1) specifying the content of user information and conditions (conditions C6) specifying the content of the password (authentication information). As the conditions specifying the update date and time of the tag table 352, for example, there are conditions (conditions C7) specifying the range of the date (start date) on which the tag table 352 can be updated and the date (end date) on which the tag table 352 cannot be updated, conditions (conditions C4) specifying the range of the time (start time) at which the tag table 352 can be updated and the time (end time) at which the tag table 352 cannot be updated, and conditions (conditions C3) specifying both the date on which the tag table 352 can be updated and the time at which the tag table 352 can be updated. As the conditions indicating that updating of the tag table 352 is not allowed, for example, there are conditions C2 and C5.

From the above, it can be seen that the limited area information is used as information for specifying the effective area of the update permission conditions. In addition, the update condition table 354 is equivalent to an "update permission condition storage section" in the appended claims.

In the example shown in FIG. 3, from the conditions C1, it can be seen that, in a region specified by the latitude range of XX. XXXX to XX. XXXX and the longitude range of XXX. XXXX to XXX. XXXX in the real world, updating of the tag table 352 is allowed when the user information for identifying the user of the head mounted display 100 is "XXX". Similarly, from the conditions C2, it can be seen that, in a region specified by the latitude range of XX. XXXX to XX. XXXX and the longitude range of XXX. XXXX to XXX. XXXX in the real world, updating of the tag table 352 is not allowed in any case. Similarly, from the conditions C3, it can be seen that, in a region specified by the latitude range of XX. XXXX to XX. XXXX and the longitude range of XXX. XXXX to XXX. XXXX in the real world, updating of the tag table 352 is allowed from 10:00 to 12:00 on Apr. 2, 2013. In addition, in FIG. 3, latitude and longitude (limited area information) of the conditions C1 to C7 and a character string, which forms user information or a password, are expressed using "X" in FIG. 3. In FIG. 3, "X" means an arbitrary character string, and different character strings are inserted in practice.

A-3. Configuration of a Head Mounted Display Device (Head Mounted Display)

Figure 4:
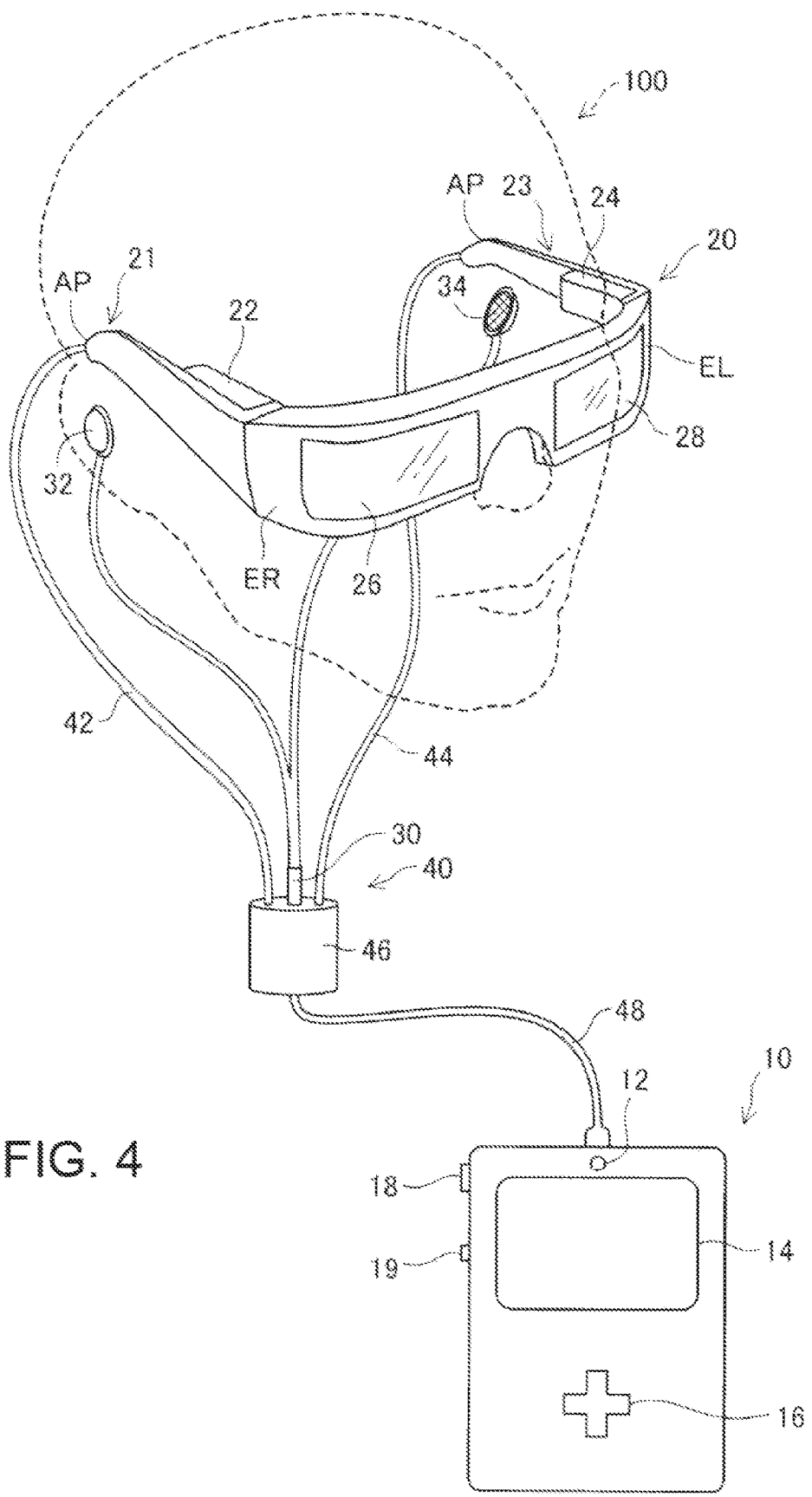
FIG. 4 is an explanatory view showing the schematic configuration of a head mounted display device according to an embodiment of the invention.

FIG. 4 is an explanatory view showing the schematic configuration of a head mounted display device according to an embodiment of the invention. The head mounted display 100 includes an image display unit 20 that enable a user to view a virtual image when mounted on the head of the user and a control unit (controller) 10 that controls the image display unit 20.

The image display unit 20 is a mounting body that is mounted on the head of the user, and has a glasses shape in the present embodiment. The image display unit 20 includes a right holding section 21, a right display driving section 22, a left holding section 23, a left display driving section 24, a right optical image display section 26, and a left optical image display section 28. The left optical image display section 28 and the right optical image display section 26 are disposed so as to be located in front of the left and right eyes of the user, respectively, when the user wears the image display unit 20. An end of the right optical image display section 26 and an end of the left optical image display section 28 are connected to each other at a position corresponding to the glabella of the user when the user wears the image display unit 20.

The right holding section 21 is a member provided so as to extend from an end ER, which is the other end of the right optical image display section 26, toward a position corresponding to the temporal region of the user when the user wears the image display unit 20. Similarly, the left holding section 23 is a member provided so as to extend from an end EL, which is the other end of the left optical image display section 28, toward a position corresponding to the temporal region of the user when the user wears the image display unit 20. The right holding section 21 and the left holding section 23 hold the image display unit 20 on the head of the user like temples of the glasses.

The right display driving section 22 is disposed on the inner side of the right holding section 21, in other words, on a side facing the head of the user when the user wears the image display unit 20. In addition, the left display driving section 24 is disposed on the inner side of the left holding section 23. In addition, hereinafter, the right holding section 21 and the left holding section 23 are simply referred to collectively as "holding section", the right display driving section 22 and the left display driving section 24 are simply referred to collectively as "display driving section", and the right optical image display section 26 and the left optical image display section 28 are simply referred to collectively as "optical image display section".

The display driving section includes liquid crystal displays (hereinafter, referred to as "LCD") 241 and 242, projection optical systems 251 and 252, and the like (refer to FIG. 2). Details of the configuration of the display driving section will be described later. The optical image display section as an optical member includes light guide plates 261 and 262 (refer to FIG. 2) and a light control plate. The light guide plates 261 and 262 are formed of a light transmissive resin material or the like, and guides image light output from the display driving section to the eyes of the user. The light control plate is an optical element having a thin plate shape, and is disposed so as to cover the front side (opposite side to the side of the eyes of the user) of the image display unit 20. The light control plate protects the light guide plates 261 and 262, and suppresses damage to the light guide plates 261 and 262, adhesion of dirt, and the like. In addition, by adjusting the light transmittance of the light control plate to adjust the amount of external light incident on the eye of the user, it is possible to adjust the ease of visibility of a virtual image. In addition, it is possible to omit the light control plate.

The image display unit 20 further includes a connection section 40 for connecting the image display unit 20 to the control unit 10. The connection section 40 includes a main body cord 48 connected to the control unit 10, a right cord 42 and a left cord 44 branched into two parts from the main body cord 48, and a connection member 46 provided on the branch point. The right cord 42 is inserted into the housing of the right holding section 21 from the distal end AP of the right holding section 21 in the extending direction, and is connected to the right display driving section 22. Similarly, the left cord 44 is inserted into the housing of the left holding section 23 from the distal end AP of the left holding section 23 in the extending direction, and is connected to the left display driving section 24. A jack for connecting an earphone plug 30 is provided in the connection member 46. From the earphone plug 30, a right earphone 32 and a left earphone 34 extend.

The image display unit 20 and the control unit 10 transmit various signals through the connection section 40. Connectors (not shown) fit to each other are provided in the end of main body cord 48, which is located on the opposite side to the connection member 46, and the control unit 10. The control unit 10 and the image display unit 20 are connected or disconnected by engagement/disengagement of the connector of the main body cord 48 and the connector of the control unit 10. For example, a metal cable or an optical fiber can be used as the right cord 42, the left cord 44, and the main body cord 48.

The control unit 10 is a device for controlling the head mounted display 100. The control unit 10 includes a lighting section 12, a touch pad 14, a cross key 16, and a power switch 18. The lighting section 12 notifies of the operating state (for example, ON/OFF of a power supply) of the head mounted display 100 according to the emission state. As the lighting section 12, for example, a light emitting diode (LED) can be used. The touch pad 14 detects a touch operation on the operating surface of the touch pad 14, and outputs a signal corresponding to the detected content. As the touch pad 14, various touch pads including an electrostatic touch pad, a pressure sensing touch pad, and an optical touch pad can be used. The cross key 16 detects a pressing operation of the key corresponding to the horizontal and vertical directions, and outputs a signal corresponding to the detected content. The power switch 18 switches the power state of the head mounted display 100 by detecting the sliding operation of the switch.

Figure 5:
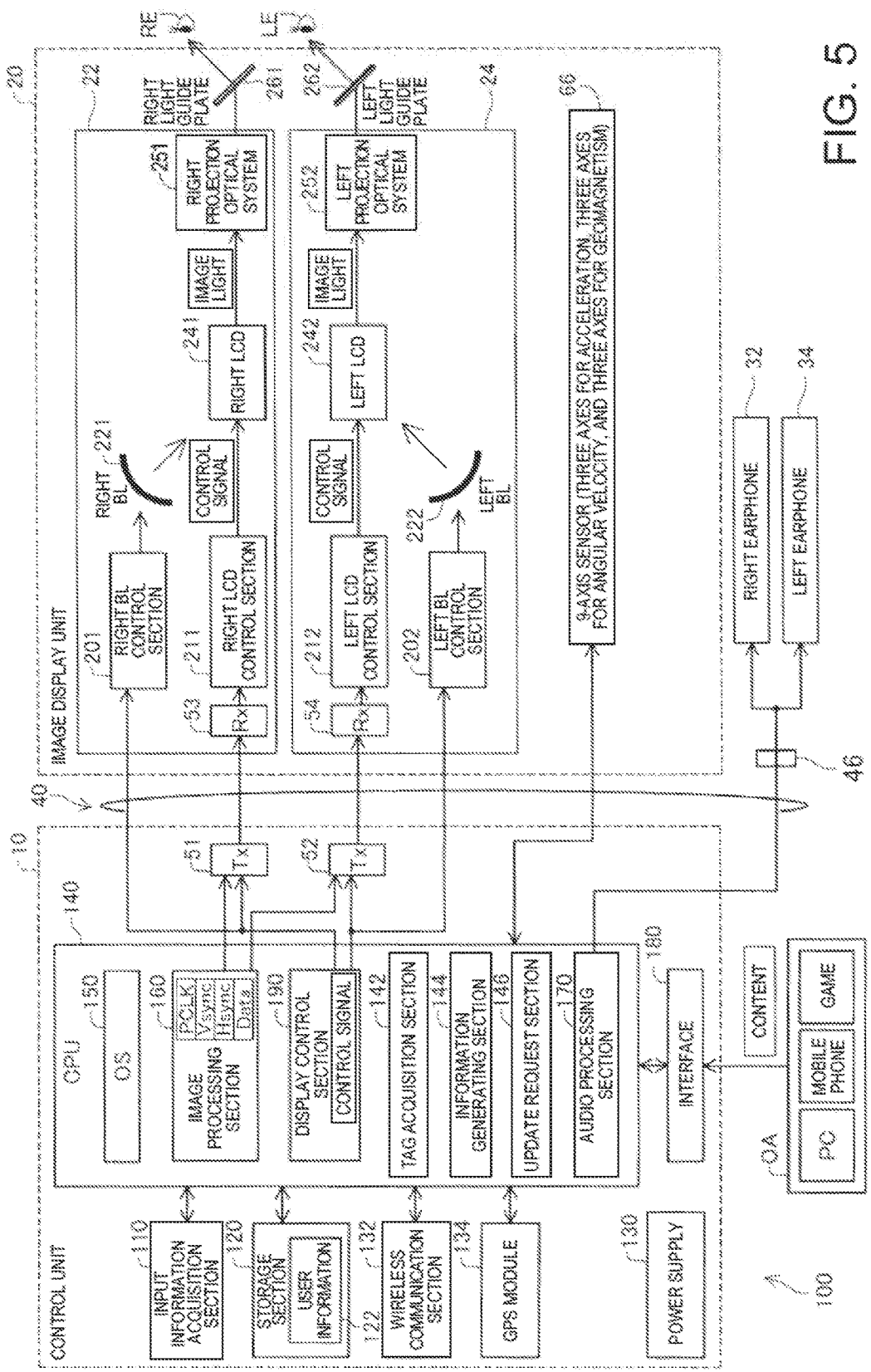
FIG. 5 is a block diagram showing the configuration of the head mounted display functionally.

FIG. 5 is a block diagram showing the configuration of the head mounted display 100 functionally. The control unit 10 includes an input information acquisition section 110, a storage section 120, a power supply 130, a wireless communication section 132, a GPS module 134, a CPU 140, an interface 180, and transmission section (Tx) 51 and 52, and these are connected to each other through a bus (not shown).

The input information acquisition section 110 acquires a signal corresponding to the operation input to the touch pad 14, the cross key 16, or the power switch 18, for example. The storage section 120 is formed by a ROM, a RAM, a DRAM, a hard disk, and the like. User information 122 is stored in the storage section 120. Information regarding the user of the head mounted display 100 is stored in advance in the user information 122. For example, authentication information, such as the account name (handle name) set by the user and a password set by the user, and at least a part of authentication information, such as the name of the user, an address of the user, a telephone number of the user, an e-mail address of the user, a network address (for example, IP address) of the head mounted display 100, a MAC address of the head mounted display 100, an account name provided by the provider of various services that the user uses, and a password provided by the provider of various services that the user uses, are included in the information regarding the user. In addition, the account name and the password (authentication information) provided by the provider of various services that the user uses may not be changed, or may be changed by the user after being provided.

The power supply 130 supplies electric power to each section of the head mounted display 100. As the power supply 130, for example, a secondary battery can be used. The wireless communication section 132 performs wireless communication with other devices in accordance with predetermined wireless communication standards, such as wireless LAN or Bluetooth. The GPS module 134 detects its current position by receiving a signal from a GPS satellite.

The CPU 140 functions as an operating system (OS) 150, an image processing section 160, an audio processing section 170, a display control section 190, a tag acquisition section 142, an information generating section 144, and an update request section 146 by reading and executing a computer program stored in the storage section 120. The tag acquisition section 142 acquires a tag from the server 300 in the limited publication process. The information generating section 144 generates information for additional presentation to provide the user of the head mounted display 100 with the augmented reality using the tag received from the server 300 in the limited publication process. The update request section 146 transmits information for updating the tag table 352 to the server 300 in the limited update process. In addition, the tag acquisition section 142 is equivalent to "information acquisition section" in the appended claims.

The image processing section 160 generates a signal on the basis of the content (image) input through the interface 180 or the wireless communication section 132. Then, the image processing section 160 supplies the generated signal to the image display unit 20 through the connection section 40. The signal supplied to the image display unit 20 is different in cases of an analog format and a digital format. In the case of the analog format, the image processing section 160 generates and transmits a clock signal PCLK, a vertical synchronization signal VSync, a horizontal synchronization signal HSync, and image data Data. Specifically, the image processing section 160 acquires an image signal included in the content. For example, in the case of a video image, the acquired image signal is an analog signal that is generally formed by 30 frame images per second. The image processing section 160 separates a synchronization signal, such as the vertical synchronization signal VSync or the horizontal synchronization signal HSync, from the acquired image signal, and generates the clock signal PCLK according to these periods using a PLL circuit or the like. The image processing section 160 converts the analog image signal, from which the synchronization signal has been separated, into a digital image signal using an A/D conversion circuit or the like. The image processing section 160 stores the digital image signal after conversion in a DRAM within the storage section 120, as the image data Data of RGB data, for each frame. On the other hand, in the case of the digital format, the image processing section 160 generates and transmits the clock signal PCLK and the image data Data. Specifically, in the case of the digital-format content, since the clock signal PCLK is output in synchronization with an image signal, the generation of the vertical synchronization signal VSync and the horizontal synchronization signal HSync and the A/D conversion of the analog image signal are not necessary. In addition, the image processing section 160 may perform image processing, such as resolution conversion processing, various kinds of color correction processing including the adjustment of brightness and chroma, and keystone correction processing, on the image data Data stored in the storage section 120.

The image processing section 160 transmits the generated clock signal PCLK, the vertical synchronization signal VSync, the horizontal synchronization signal HSync, and the image data Data stored in the DRAM within the storage section 120 through the transmission sections 51 and 52. In addition, the image data Data transmitted through the transmission section 51 is also referred to as "right-eye image data Data1", and the image data Data transmitted through the transmission section 52 is also referred to as "left-eye image data Data2". The transmission sections 51 and 52 function as a transceiver for serial transmission between the control unit 10 and the image display unit 20.

The display control section 190 generates control signals to control the right display driving section 22 and the left display driving section 24. Specifically, using the control signals, the display control section 190 separately controls driving ON/OFF of a right LCD 241 by a right LCD control section 211, driving ON/OFF of a right backlight 221 by a right backlight control section 201, driving ON/OFF of a left LCD 242 by a left LCD control section 212, driving ON/OFF of a left backlight 222 by a left backlight control section 202, and the like. Thus, the generation and emission of image light by the right display driving section 22 and the left display driving section 24 are controlled. For example, the display control section 190 makes both the right display driving section 22 and the left display driving section 24 generate image light, or makes only one of them generate image light, or makes neither of them generate image light. In addition, the display control section 190 transmits control signals for the right LCD control section 211 and the left LCD control section 212 through the transmission sections 51 and 52, respectively. In addition, the display control section 190 transmits control signals for the right backlight control section 201 and the left backlight control section 202.

The audio processing section 170 acquires an audio signal included in the content, amplifies the acquired audio signal, and supplies the audio signal to a speaker (not shown) in the right earphone 32 and a speaker (not shown) in the left earphone 34 that are connected to the connection member 46. In addition, for example, when the Dolby (registered trademark) system is adopted, processing on the audio signal is performed and different sounds having, for example, changed frequencies are output from the right earphone 32 and the left earphone 34.

The interface 180 is an interface for connecting various external devices OA, which are supply sources of the content, to the control unit 10. Examples of the external instrument OA include a personal computer PC, a mobile phone terminal, and a game terminal. As the interface 180, for example, a USB interface, a micro USB interface, and a memory card interface can be used.

The image display unit 20 includes the right display driving section 22, the left display driving section 24, the right light guide plate 261 as the right optical image display section 26, the left light guide plate 262 as the left optical image display section 28, and a 9-axis sensor 66.

The 9-axis sensor 66 is a motion sensor that detects acceleration (three axes), angular velocity (three axes), and geomagnetism (three axes). The 9-axis sensor 66 is provided in the image display unit 20. Therefore, when the image display unit 20 is mounted on the head of the user, the 9-axis sensor 66 functions as a motion detector that detects motion of the head of the user. Here, the motion of the head includes velocity, acceleration, angular velocity, and direction of the head and a direction change.

The right display driving section 22 includes a receiving section (Rx) 53, a right backlight (BL) control section 201 and a right backlight (BL) 221 that function as a light source, a right LCD control section 211 and a right LCD 241 that function as a display element, and a right projection optical system 251. In addition, the right backlight control section 201, the right LCD control section 211, the right backlight 221, and the right LCD 241 are also referred to collectively as a "image light generating section".

The receiving section 53 function as a receiver for serial transmission between the control unit 10 and the image display unit 20. The right backlight control section 201 drives the right backlight 221 on the basis of an input control signal. For example, the right backlight 221 is a light emitter, such as an LED or electroluminescence (EL). The right LCD control section 211 drives the right LCD 241 on the basis of the clock signal PCLK, the vertical synchronization signal VSync, the horizontal synchronization signal HSync, and the right-eye image data Data1 that are input through the receiving section 53. The right LCD 241 is a transmissive liquid crystal panel in which a plurality of pixels are disposed in a matrix. The right LCD 241 changes the transmittance of light, which is transmitted through the right LCD 241, by driving liquid crystal at a position of each of pixels disposed in a matrix, thereby modulating illumination light emitted from the right backlight 221 to effective image light expressing an image. In addition, although the back light method is adopted in the present embodiment, it is also possible to emit image light using a front light method or a reflection method.

The right projection optical system 251 is formed by a collimating lens that makes image light emitted from the right LCD 241 be parallel light. The right light guide plate 261 as the right optical image display section 26 guides the image light, which is output from the right projection optical system 251, to the right eye RE of the user while reflecting the image light along a predetermined optical path. In the optical image display section, any method can be used as long as a virtual image is formed in front of the eyes of the user using the image light. For example, it is possible to use a diffraction grating or use a transflective film.

The left display driving section 24 has the same configuration as the right display driving section 22. That is, the left display driving section 24 includes a receiving section (Rx) 54, a left backlight (BL) control section 202 and a left backlight (BL) 222 that function as a light source, a left LCD control section 212 and a left LCD 242 that function as a display element, and a left projection optical system 252.

Figure 6A:
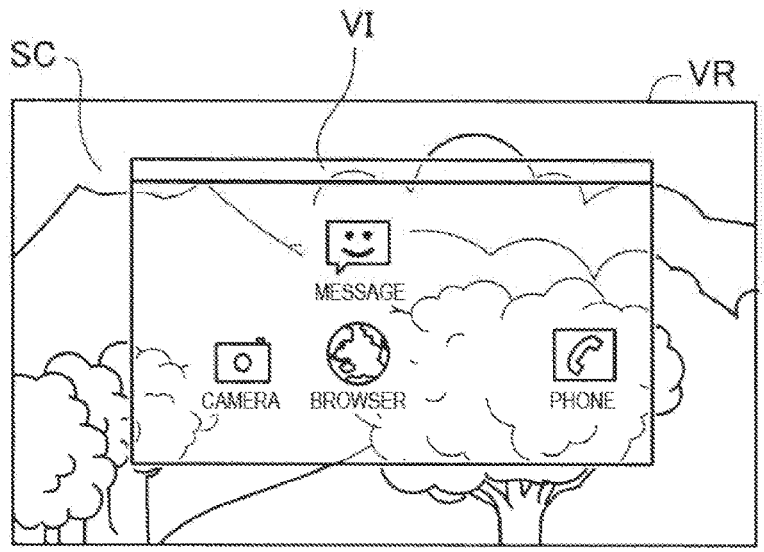
FIGS. 6A and 6B are explanatory views showing an example of a virtual image viewed by a user.
Figure 6B:
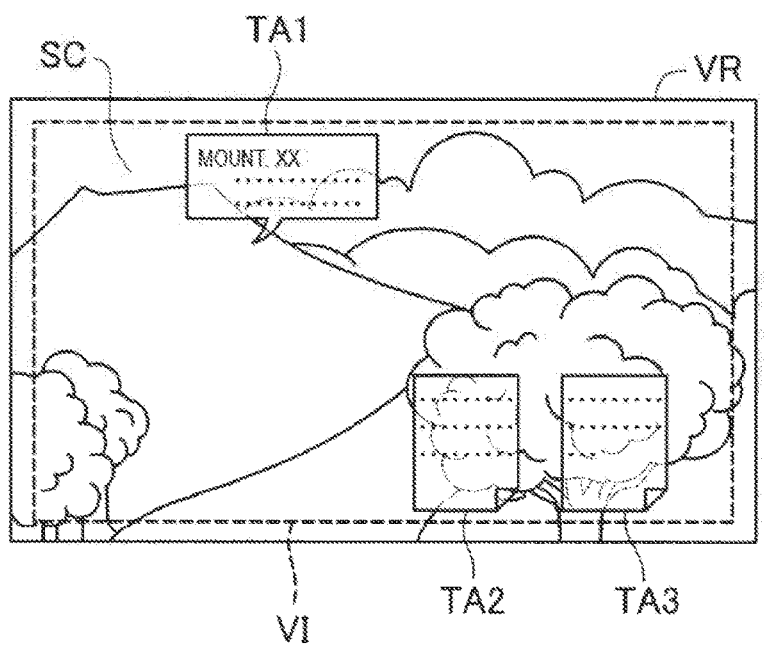

FIGS. 6A and 6B are explanatory views showing an example of a virtual image viewed by the user. FIG. 6A illustrates a field of view VR of the user during the normal display process. When image light guided to the eyes of the user of the head mounted display 100 is imaged on the retina of the user, the user views a virtual image VI. In the example shown in FIG. 6A, the virtual image VI is a standby screen of the OS of the head mounted display 100. In addition, the user views an outside scene SC transmitted through the right optical image display section 26 and the left optical image display section 28. Thus, for a portion of the field of view VR in which the virtual image VI is displayed, the user of the head mounted display 100 of the present embodiment can see the virtual image VI and the outside scene SC behind the virtual image VI. In addition, for a portion of the field of view VR in which the virtual image VI is not displayed, the user of the head mounted display 100 can see directly the outside scene SC transmitted through the optical image display section.

FIG. 6B illustrates the field of view VR of the user during the limited publication process. In the limited publication process, the information generating section 144 of the head mounted display 100 generates information for additional presentation to extend the outside scene SC that the user perceives using the tag acquired by the tag acquisition section 142. A method of generating the information for additional presentation will be described later. In addition, "extend the outside scene SC" means adding, deleting, emphasizing, and attenuating the information for the real environment viewed through the eyes of the user, that is, the outside scene SC. The information generating section 144 transmits the generated information for additional presentation to the image processing section 160. In the image processing section 160 that has received the information for additional presentation, the display process described in FIG. 5 is performed. As a result, the user can view the information for additional presentation as the virtual image VI. In the example shown in FIG. 6B, a balloon shaped tag TA1, which is displayed so as to overlap the real mountain included in the outside scene SC, and note shaped tags TA2 and TA3, which are displayed in front of the tree included in the outside scene SC, are included in the virtual image VI. Accordingly, the user can have a sense of the balloon shaped tag or the note shaped tag attached onto the outside scene SC.

A-4. Limited Publication Process

Figure 7:
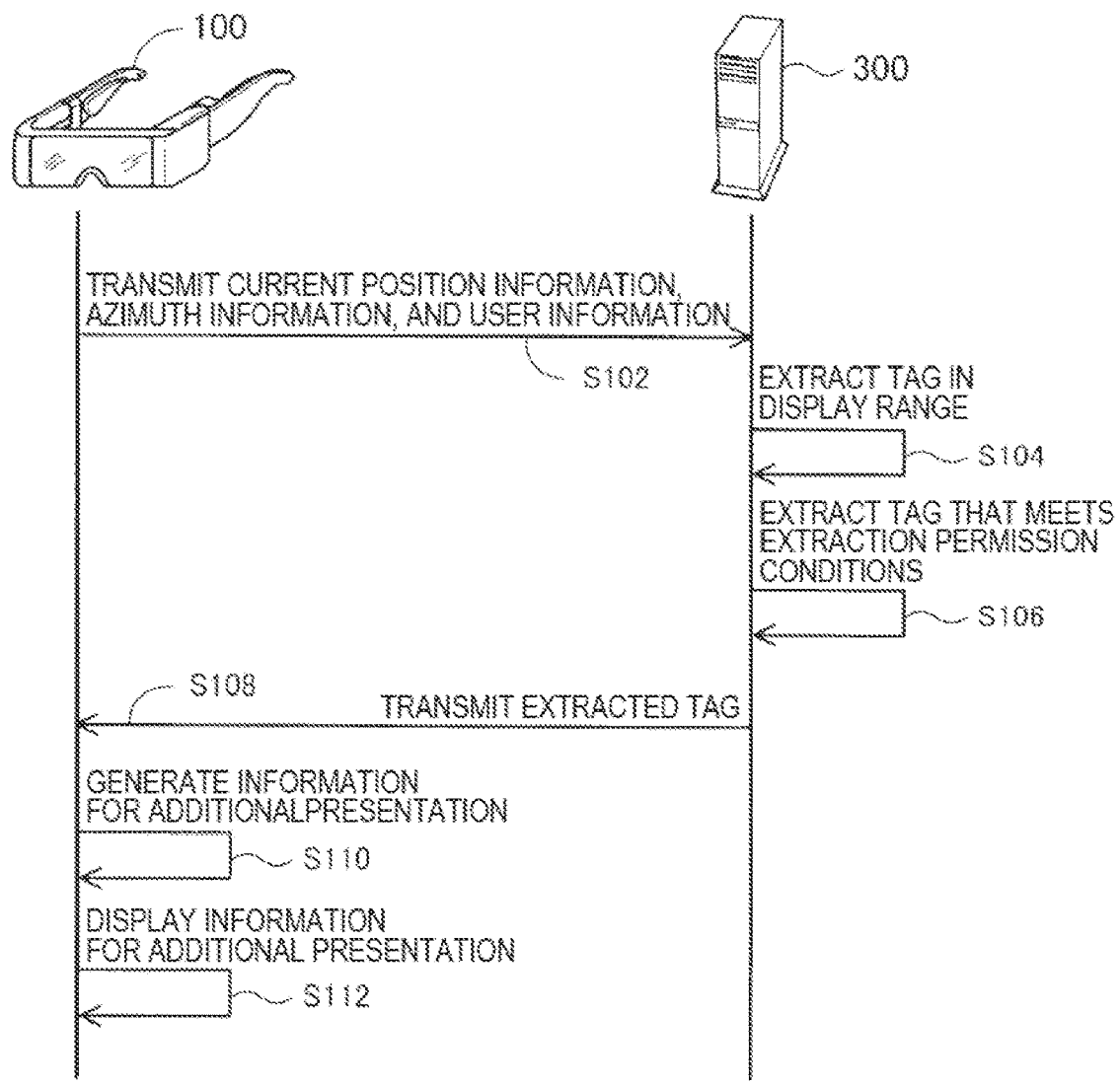
FIG. 7 is a flowchart showing the procedure of the limited publication process.

FIG. 7 is a flowchart showing the procedure of the limited publication process. The limited publication process is a process when the extraction unit 342 extracts a tag from the storage section (tag table 352) that stores tag information and displays the extracted tag on the head mounted display 100. In addition, in FIG. 7, the head mounted display 100 and the server 300 are described in a one-to-one relationship. However, the head mounted display 100 and the server 300 may be in a many-to-one relationship or may be in a many-to-many relationship.

The tag acquisition section 142 of the head mounted display 100 transmits a request to acquire a tag, in which current position information, azimuth information, and user information are included, to the server 300 (step S102). Here, the information generating section 144 can use the position information of the control unit 10, which is detected by the GPS module 134 (FIG. 5), as the current position information. The information generating section 144 can use the direction of the image display unit 20, which is detected by a geomagnetic sensor (FIG. 5) included in the 9-axis sensor 66, as the azimuth information. The information generating section 144 can use information stored in the user information 122 (FIG. 5) as the user information.

Figure 8:
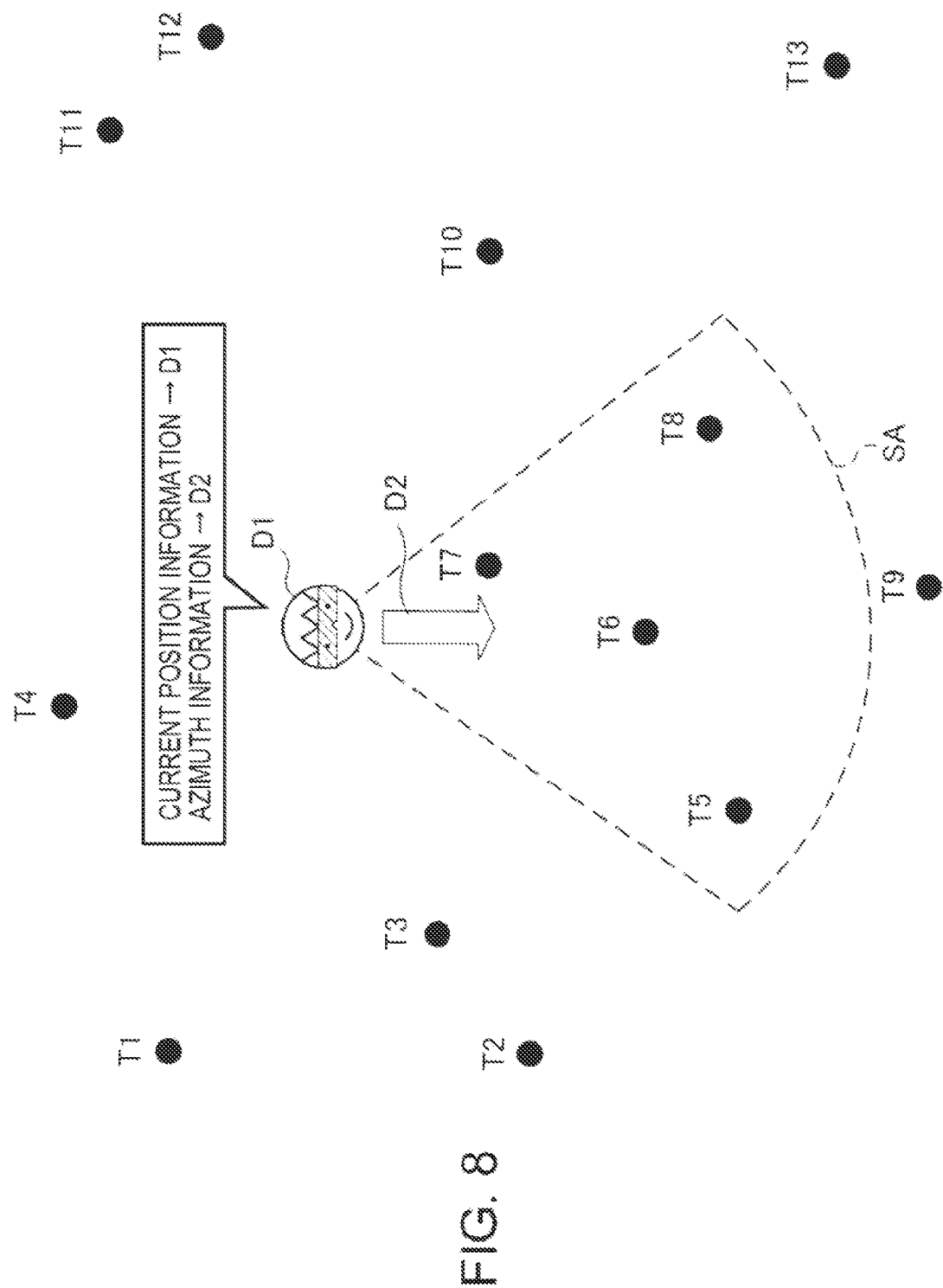
FIG. 8 is an explanatory view for explaining step S104 of the limited publication process.

FIG. 8 is an explanatory view for explaining step S104 of the limited publication process. In FIG. 8, a tag of the tag table 352 is plotted at a position according to the position information matched with the tag. In step S104 of FIG. 7, the extraction unit 342 of the server 300 that has received the tag acquisition request extracts the tag in the display range. Specifically, the extraction unit 342 executes the following procedures a1 to a3.

(a1) The extraction unit 342 determines a position D1 of the user from the current position information included in the tag acquisition request (FIG. 8).

(a2) The extraction unit 342 determines a direction D2 of the user from the azimuth information included in the tag acquisition request (FIG. 8).

(a3) The extraction unit 342 extracts a tag having position information, which is included in a predetermined range SA extending toward the direction D2 of the user from the position D1 of the user, from the tag table 352.

In the example shown in FIG. 8, tag information T5, T6, T7, and T8 is extracted as a result of the above-described procedures a1 to a3. In addition, the "predetermined range SA" in the procedure a3 can be determined arbitrarily. However, in order to provide comfortable augmented reality, it is preferable to match the predetermined range SA with the range of the field of view of the user.

In step S106 of FIG. 7, the extraction unit 342 that has extracted the tag in the display range further extracts a tag that meets the extraction permission conditions. Specifically, the extraction unit 342 performs the following procedures b1 to b4 for all of the tags extracted in step S104.

(b1) In the tag table 352, extraction permission conditions matched with the tag are referred to.

(b2) When the extraction permission conditions are conditions specifying a user for whom publication of a tag is allowed, the extraction unit 342 determines whether or not the user information included in the tag acquisition request satisfies the extraction permission conditions. When the user information satisfies the extraction permission conditions, the extraction unit 342 sets the tag as a tag to be extracted. When the user information does not satisfy the extraction permission conditions, the extraction unit 342 discards the tag.

(b3) When the extraction permission conditions are conditions specifying the publication date and time of a tag, the extraction unit 342 determines whether or not the current date and time satisfies the extraction permission conditions. In addition, the extraction unit 342 can acquire the current date and time from the system clock in the CPU 340. When the current date and time satisfies the extraction permission conditions, the extraction unit 342 sets the tag as a tag to be extracted. When the current date and time does not satisfy the extraction permission conditions, the extraction unit 342 discards the tag.

(b4) When the extraction permission conditions are conditions indicating that the publication of a tag is allowed without limit, the extraction unit 342 sets the tag as a tag to be extracted.

For example, when the transmission date is Feb. 26, 2013 and time when the tag acquisition request is transmitted in step S102 is 22:00 and the user information included in the tag acquisition request is "XXXXX", all pieces of the tag information T5, T6, T7, and T8 extracted in step S104 are targets to be extracted as a result of the above-described procedures b1 to b4. On the other hand, when the transmission date is Feb. 26, 2013 and the time when the tag acquisition request is transmitted in step S102 is 17:00 and the user information included in the tag acquisition request is "XX", only T5 and T7 of the tag information extracted in step S104 are targets to be extracted as a result of the above-described procedures b1 to b4.

In step S108 of FIG. 7, the communication unit 330 transmits the tag extracted by the extraction unit 342 to the head mounted display 100. In addition, in step S108, the communication unit 330 may transmit tag information including an identifier or position information as well as a tag.

In step S110, the tag acquisition section 142 of the head mounted display 100 that has received the tag makes the information generating section 144 generate information for additional presentation. Specifically, the information generating section 144 executes the following procedures c1 to c4.

(c1) The information generating section 144 stores the tag acquired by the tag acquisition section 142 in the storage section 120.

(c2) The information generating section 144 generates an icon indicating a link to the tag stored in the storage section 120. An icon may be changed according to the type of the tag or the setting of the user of the head mounted display 100.

(c3) The information generating section 144 generates information for additional presentation by placing the icon generated in the procedure c2 at an arbitrary location and placing black dummy data in other portions. In addition, when the tag acquisition section 142 acquires not only a tag but also position information matched with the tag, the information generating section 144 may determine a location where the icon is disposed on the basis of the acquired position information and the current position information and azimuth information of the user.

(c4) When there are a plurality of tags acquired by the tag acquisition section 142, the information generating section 144 repeats the procedures c1 to c3. Then, the information generating section 144 generates a composite image by placing the plurality of pieces of information for additional presentation, which has been generated, in each layer and sets the generated composite image as (final) information for additional presentation.

In step S112 of FIG. 7, the information generating section 144 displays the generated information for additional presentation. Details thereof are the same as described in FIG. 6B.

Figure 9:
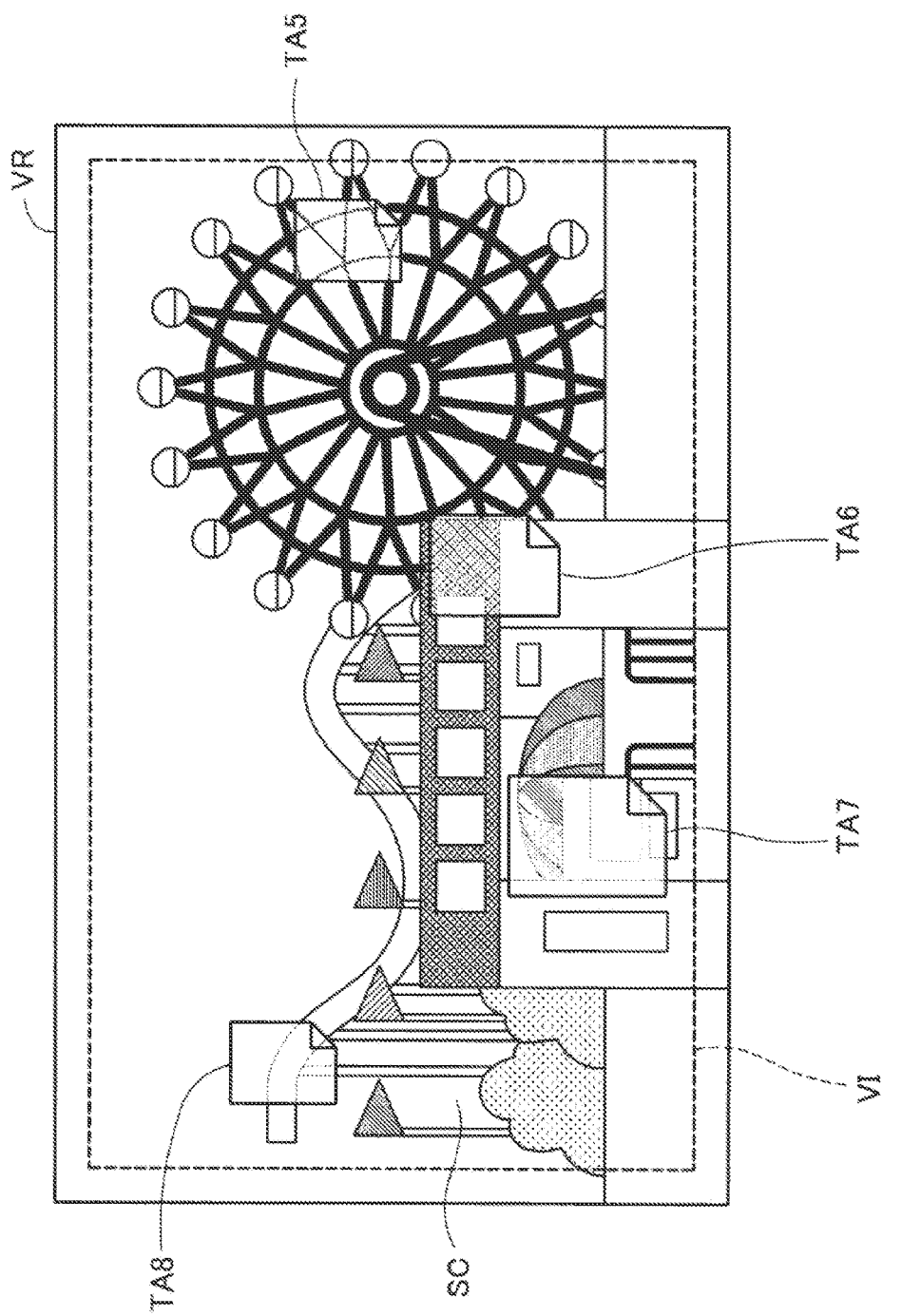
FIG. 9 is an explanatory view showing an example of a virtual image viewed by the user in step S112 of the limited publication process.

FIG. 9 is an explanatory view showing an example of a virtual image viewed by the user in step S112 of the limited publication process. In the example shown in FIG. 9, a tag TA5 displayed on the Ferris wheel included in the outside scene SC, a tag TA6 displayed next to the gate included in the outside scene SC, a tag TA7 displayed near the center of the gate included in the outside scene SC, and a tag TA8 displayed on the roller coaster included in the outside scene SC are included in a virtual image VI. In addition, the position and size of each tag in the virtual image VI (information for additional presentation) are determined according to changes in the position information of each tag (FIG. 8) with the current position information D1 and the azimuth information D2 of the user as a reference. That is, the tag TA7 matched near the current position information D1 of the user in FIG. 8 is displayed in a large size in the vicinity of the center of the virtual image VI, and the tags TA5 and TA8 matched far from the current position information D1 of the user in FIG. 8 are displayed in a small size at the end of the virtual image VI. In this manner, the user of the head mounted display 100 can grasp intuitively the position where the tag is matched.

As described above, according to the limited publication process of the first embodiment, the extraction unit 342 of the server 300 (information apparatus) extracts a tag (target information) from the tag table 352 (target information storage section) on the basis of the user information that is information regarding the user of the head mounted display 100 (head mounted display device), and transmits the extracted tag to the head mounted display 100. Then, the head mounted display 100 generates information for additional presentation using the acquired tag, and makes the information for additional presentation be viewed as the virtual image VI by the user. Thus, the extraction unit 342 of the server 300 can publish the tag only for the user of the head mounted display 100 that transmits the user information satisfying the extraction permission conditions. Therefore, it is possible to set limits on the publication of information in the information display system that provides the AR-SNS service.

In addition, the extraction unit 342 of the server 300 (information apparatus) can limit the publication of a tag in the information display system 1000 in units of a "user" using the conditions specifying a user for whom publication of a tag is allowed. In addition, the extraction unit 342 of the server 300 can limit the publication of a tag in the information display system 1000 in units of "date and time" using the conditions specifying the publication date and time of a tag.

In addition, the extraction permission conditions are stored in the tag table 352 (target information storage section) of the server 300 (information apparatus) so as to match the tag (target information). Therefore, it is possible to set limits on the publication in detail for each tag.

A-4-1. Variation of the Tag Table 352

FIGS. 10A and 10B are explanatory views showing other examples of the tag table 352. FIG. 10A is an explanatory view showing the first variation of the tag table 352. The difference from the tag table 352 shown in FIG. 2 is that the degree of importance is set in addition to an identifier, a tag, position information, and extraction permission conditions. The degree of importance of a tag is stored in the degree of importance. The value of the degree of importance can be set, for example, when the user uploads tag information into the tag table 352. For example, in the example shown in FIG. 10A, it can be seen that the degree of importance of tag information T1 is "high". Similarly, it can be seen that the degree of importance of tag information T2 is "medium" and the degree of importance of tag information T3 is "urgent". In addition, the method shown in FIGS. 10A and 10B may be used for the degree of importance, or letters or number may be used for the degree of importance. The degree of importance is equivalent to "order information" in the appended claims.

The degree of importance is used to determine the order in which tags are displayed on the head mounted display 100. In step S108 of the limited publication process (FIG. 7), the extraction unit 342 of the server 300 transmits the extracted tag and the degree of importance matched with the extracted tag to the head mounted display 100. In step S110, the information generating section 144 of the head mounted display 100 generates information for additional presentation by superimposing the received tags in the order according to the received degree of importance. Specifically, when generating a composite image in which a plurality of pieces of information for additional presentation generated in the procedure c4 of generating the information for additional presentation are placed in respective layers, the information generating section 144 places the information for additional presentation, which is generated by the tag with a high degree of importance, in the high-order layer.

FIG. 10B is an explanatory view showing the second variation of the tag table 352. The difference from the tag table 352 shown in FIG. 2 is that the agreement number is set in addition to an identifier, a tag, position information, and extraction permission conditions. Evaluation on a tag from the user is stored in the agreement number. The value of the agreement number is incremented, for example, when the user who has browsed the tag performs a certain operation, such as pressing a button. That is, it can be seen that the larger the value of the agreement number, the greater the number of users who have agreed with the tag. For example, in the example shown in FIG. 10B, it can be seen that the agreement number of the tag information T1 is "8". Similarly, it can be seen that the agreement number of the tag information T2 is "15" and the agreement number of the tag information T3 is "243". In addition, the method shown in FIGS. 10A and 10B may be used for the agreement number, or letters or number may be used for the agreement number. The agreement number is equivalent to "order information" in the appended claims.

The agreement number is used to determine the order in which tags are displayed on the head mounted display 100. In step S108 of the limited publication process (FIG. 7), the extraction unit 342 of the server 300 transmits the extracted tag and the agreement number matched with the extracted tag to the head mounted display 100. In step S110, the information generating section 144 of the head mounted display 100 generates information for additional presentation by superimposing the received tags in the order according to the received agreement number. Specifically, when generating a composite image in which a plurality of pieces of information for additional presentation generated in the procedure c4 of generating the information for additional presentation are placed in respective layers, the information generating section 144 places the information for additional presentation, which is generated by the tag with a high agreement number, in the high-order layer.

As described above, according to the limited publication process using the first and second variations of the tag table 352, the server 300 (information apparatus) transmits the degree of importance or the agreement number (order information) for determining the display order of tags to the head mounted display 100 (head mounted display device) together with the tag (target information). In the head mounted display 100, when a plurality of tags are received, information for additional presentation is generated by superimposing the tags in the order according to the order information. Thus, when transmitting a plurality of tags to the head mounted display 100, the server 300 can specify which tag is to be displayed in a top layer in the information for additional presentation, that is, which tag is made to be easily viewed by the user.

A-5. Limited Update Process

Figure 11:
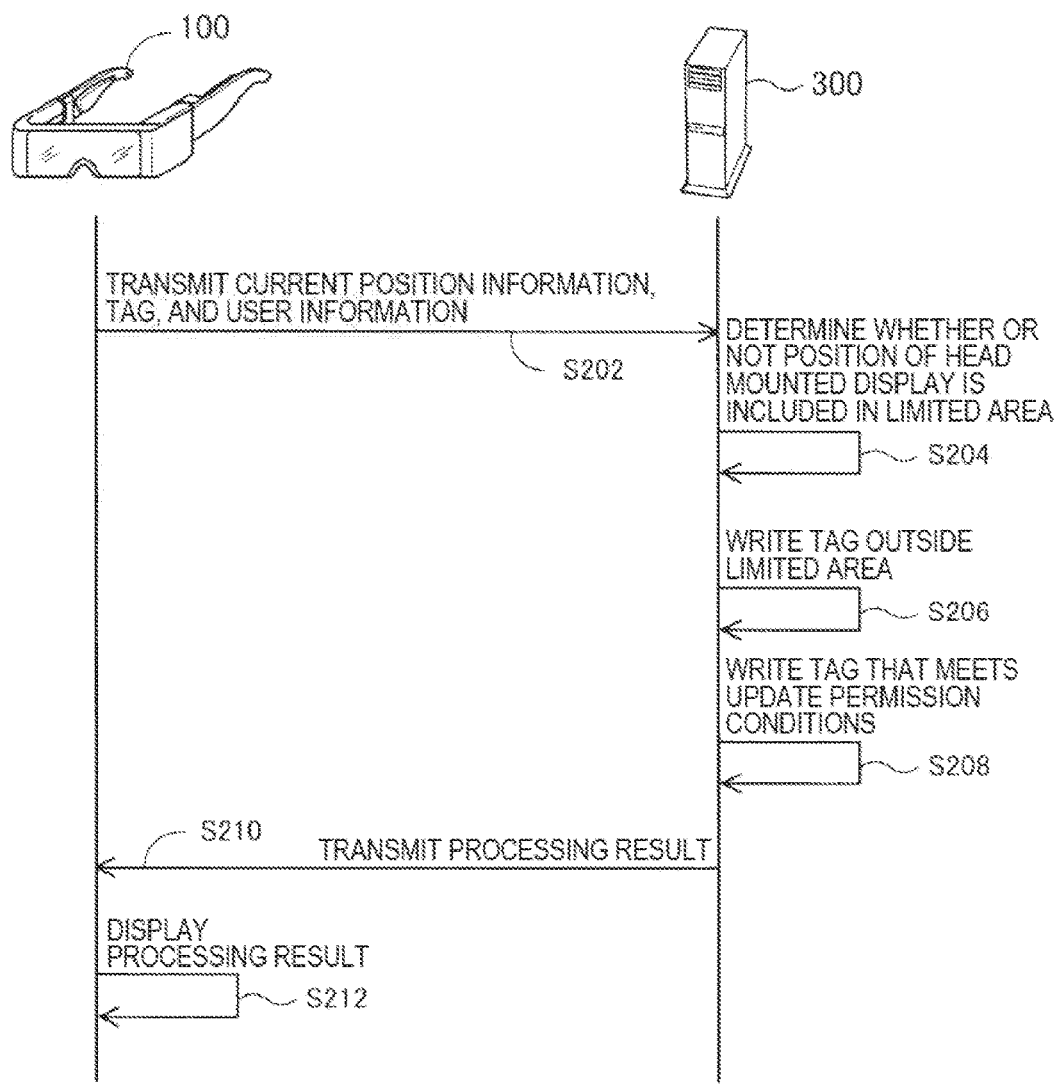
FIG. 11 is a flowchart showing the procedure of the limited update process.

FIG. 11 is a flowchart showing the procedure of the limited update process. The limited update process is a process of receiving information transmitted from a client apparatus (head mounted display 100) and updating the storage section (tag table 352), which stores the tag information, using the received information when the received information satisfies the conditions. In addition, in FIG. 11, the head mounted display 100 and the server 300 are described in a one-to-one relationship. However, the head mounted display 100 and the server 300 may be in a many-to-one relationship or may be in a many-to-many relationship.

The update request section 146 of the head mounted display 100 transmits a request to write a tag, in which current position information, a tag, and user information are included, to the server 300 (step S202). The current position information and the user information are the same as those in step S102 of FIG. 7. In addition, a tag is information to be published that is specified by the user of the head mounted display 100, and includes a text file, an application data file, an image file including a still image or a video image, and an audio file.

Figure 12:
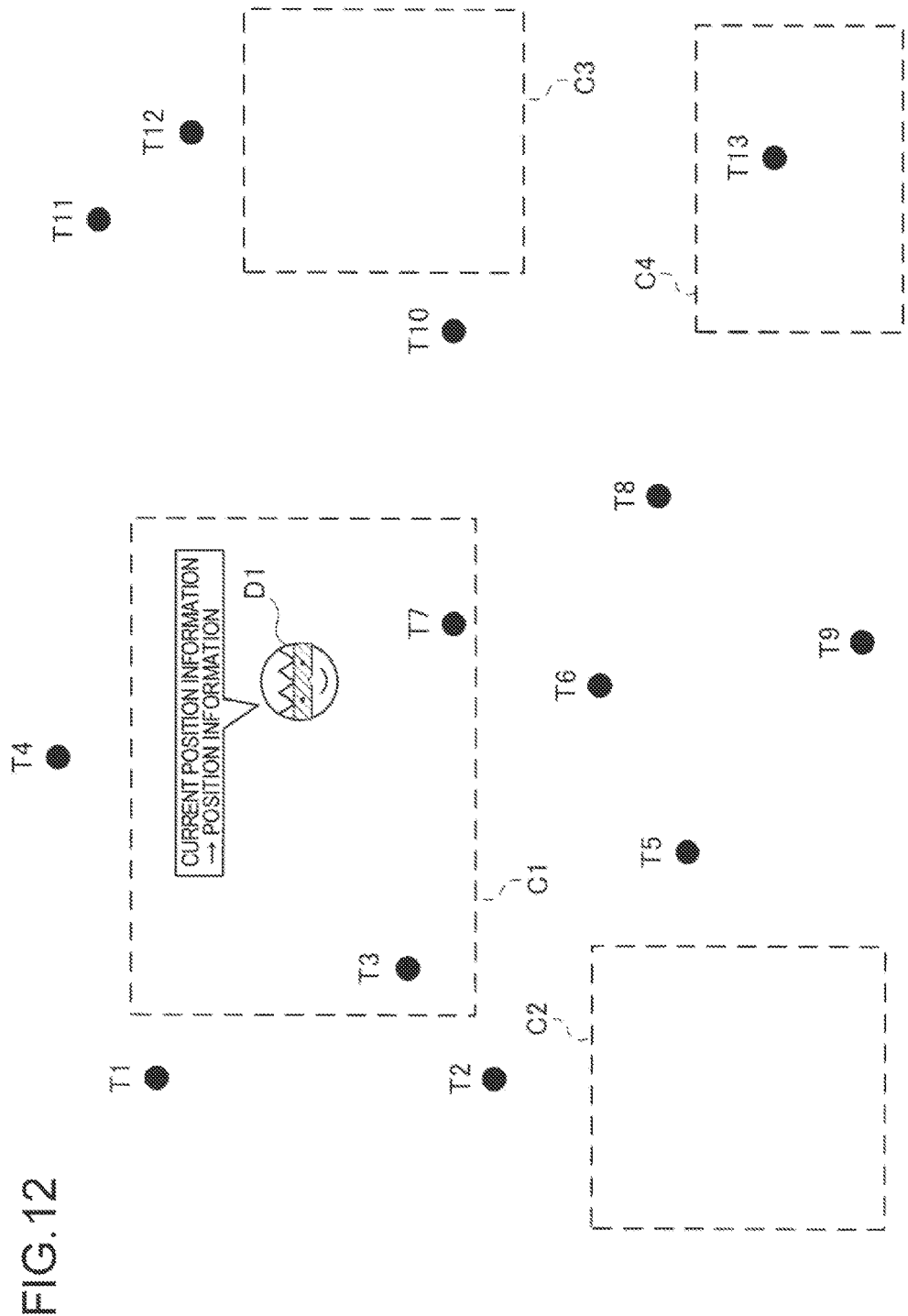
FIG. 12 is an explanatory view for explaining step S204 of the limited update process.

FIG. 12 is an explanatory view for explaining step S204 of the limited update process. In FIG. 12, a limited area (that is, effective area of update permission conditions) specified by the limited area information of the update condition table 354 is expressed by the dotted line. In addition, a tag of the tag table 352 is plotted at a position according to the position information matched with the tag. In step S204 of FIG. 11, the update unit 344 of the server 300 that has received the tag write request determines whether or not the position of the head mounted display 100 that has transmitted the tag write request is included in the limited area. Specifically, the update unit 344 performs the following procedures d1 and d2.

(d1) The update unit 344 determines a position D1 of the user from the current position information included in the tag write request (FIG. 12).

(d2) The update unit 344 determines whether or not the position D1 of the user is within a range of the limited areas C1 to C7 specified by the limited area information of the update condition table 354 (FIG. 12).

When the position of the head mounted display 100 is not within the range of the limited areas C1 to C7, the update unit 344 writes the received tag in the tag table 352 (step S206). Specifically, the update unit 344 updates tags of the tag table 352 using the tag included in the tag write request. Similarly, the update unit 344 updates the position information of the tag table 352 using the current position information included in the tag write request, and updates the identifier using a unique identifier allocated systematically. In addition, when the extraction permission conditions of a tag are included in the tag write request, the update unit 344 updates the extraction permission conditions of the tag table 352.

On the other hand, when the position of the head mounted display 100 is included within the range of the limited areas C1 to C7, the update unit 344 writes a tag that meets the update permission conditions, of the received tags, in the tag table 352 (step S208). Specifically, the update unit 344 performs the following procedures e1 to e4.

(e1) In the update condition table 354, update permission conditions matched with the limited area (calculated in the above-described procedure d2) where the head mounted display 100 is located are referred to.

(e2) When the update permission conditions are conditions specifying a user for whom updating of the tag table 352 is allowed, the update unit 344 determines whether or not the user information included in the tag write request satisfies the update permission conditions. When the user information satisfies the update permission conditions, the update unit 344 writes tags included in the received tag write request in the tag table 352. Details thereof are the same as in step S206. When the user information does not satisfy the update permission conditions, the update unit 344 discards the tag write request.

(e3) When the update permission conditions are conditions specifying the update date and time of the tag table 352, the update unit 344 determines whether or not the current date and time satisfies the update permission conditions. In addition, the update unit 344 can acquire the current date and time from the system clock in the CPU 340. When the current date and time satisfies the update permission conditions, the update unit 344 writes tags included in the received tag write request in the tag table 352. Details thereof are the same as in step S206. When the current date and time does not satisfy the update permission conditions, the update unit 344 discards the tag write request.

(e4) When the update permission conditions are conditions indicating that the updating of the tag table 352 is not allowed, the update unit 344 discards the tag write request.

In step S210 of FIG. 11, the update unit 344 transmits the processing result to the head mounted display 100. The update request section 146 of the head mounted display 100 that has received the processing result generates a notification screen for notifying the user of the processing result, and transmits the notification screen to the image processing section 160. Since the display process described with reference to FIG. 5 is performed by the image processing section 160, the user of the head mounted display 100 can view the notification screen as the virtual image VI.

As described above, according to the limited update process of the first embodiment, the update unit 344 of the server 300 (information apparatus) updates the tag table 352 (target information storage section) using the tag write request when the tag write request (received information) received from the head mounted display 100 (head mounted display device) satisfies the update permission conditions. Therefore, tags (information) accumulated in the tag table 352 can be limited to information satisfying the update permission conditions. As a result, it is possible to set limits the accumulation of information in the information display system 1000 that provides the AR-SNS service.

In addition, the update unit 344 of the server 300 (information apparatus) can limit the accumulation of information into the tag table 352 in units of a "user" using the conditions specifying a user for whom updating of the tag table 352 (target information storage section) is allowed. In addition, the update unit 344 of the server 300 can limit the accumulation of information into the tag table 352 in units of "date and time" using the conditions specifying the update date and time of the tag table 352. In addition, the update unit 344 of the server 300 can limit the accumulation of all pieces of information into the tag table 352 using the conditions indicating that the updating of the tag table 352 is not allowed.

In addition, in the update condition table 354 (update condition storage section) of the server 300 (information apparatus), limited area information for specifying the limited area where the updating of the tag table 352 (target information storage section) is limited is stored so as to match the update permission conditions. Therefore, the update unit 344 of the server 300 can apply the update permission conditions for each limited area. As a result, it is possible to set limits on the accumulation of information in detail for each limited area in the information display system 1000 that provides the AR-SNS service.

B. Second Embodiment

In a second embodiment of the invention, a configuration to implement an information display system with only a single head mounted display device will be described. Hereinafter, only a portion having different configuration and operation from the first embodiment will be described. In addition, in corresponding drawings, the same reference numerals as in the first embodiment described previously are given to the same components as in the first embodiment, and detailed explanation thereof will be omitted.

B-1. Configuration of an Information Display System

An information display system of the second embodiment includes a head mounted display. The difference from the first embodiment shown in FIG. 1 is that the server 300 is not provided.

B-2. Configuration of a Head Mounted Display Device (Head Mounted Display)

Figure 13:
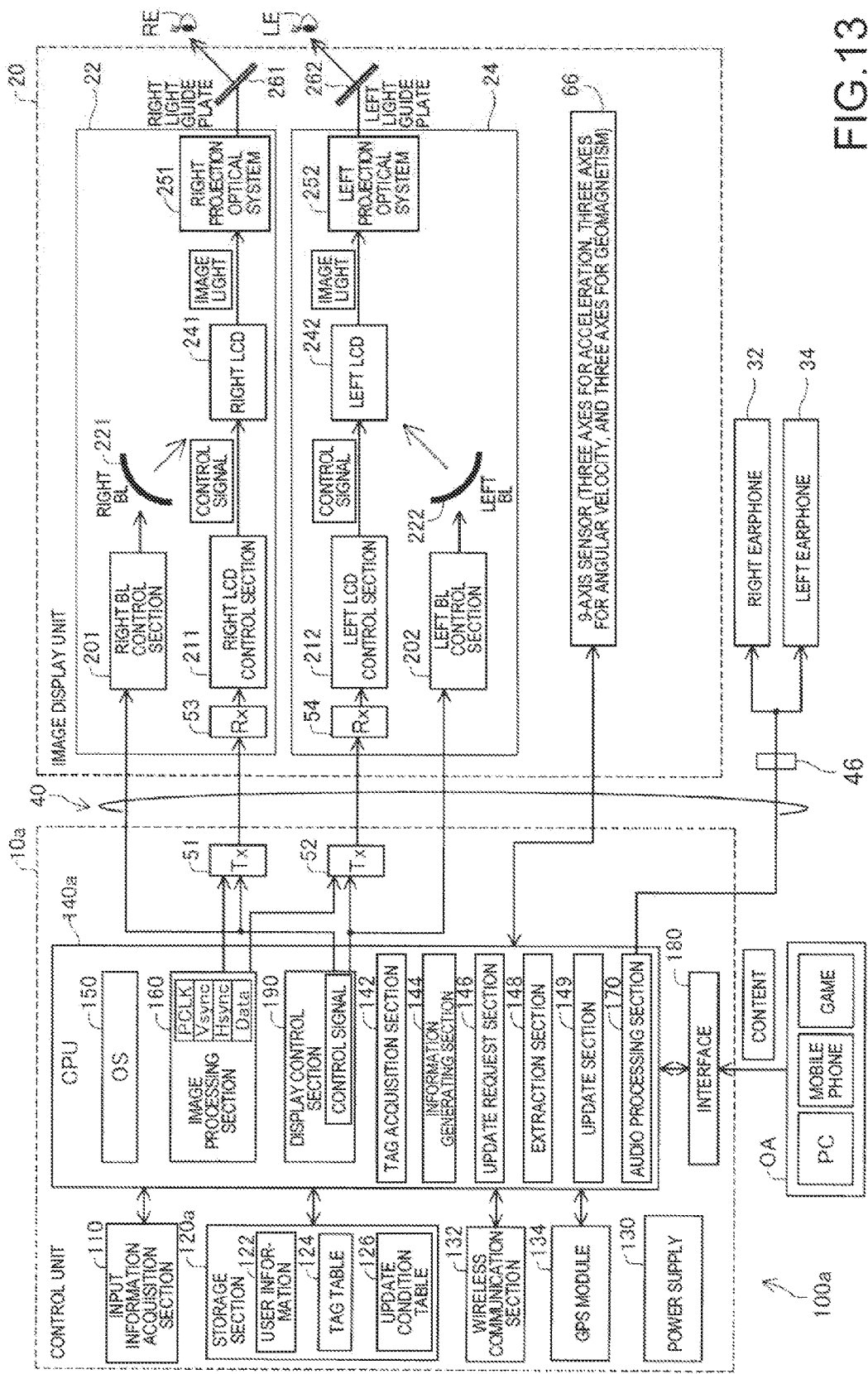
FIG. 13 is a block diagram showing functionally the configuration of a head mounted display according to a second embodiment.

FIG. 13 is a block diagram showing functionally the configuration of a head mounted display 100a in the second embodiment. The difference from the first embodiment shown in FIG. 5 is that a control unit 10a is provided instead of the control unit 10. The control unit 10a includes a storage section 120a instead of the storage section 120, and includes a CPU 140a instead of the CPU 140.

The storage section 120a further includes a tag table 124 and an update condition table 126 in addition to the user information 122. The configuration of the tag table 124 is the same as that of the tag table 352 shown in FIG. 2. The configuration of the update condition table 126 is the same as that of the update condition table 354 shown in FIG. 3.

The CPU 140a includes an extraction section 148 and an update section 149 in addition to the OS 150, the image processing section 160, the audio processing section 170, the display control section 190, the tag acquisition section 142, the information generating section 144, and the update request section 146. The function and operation of the extraction section 148 are the same as those of the extraction unit 342 shown in FIG. 1. However, the extraction section 148 refers to the tag table 124. The function and operation of the update section 149 are the same as those of the update unit 344 shown in FIG. 1. However, the update section 149 refers to the update condition table 126, and sets the tag table 124 as an update target.

B-3. Limited Publication Process

A limited publication process in the second embodiment is the same as "A-4. Limited publication process" shown in FIG. 7. However, a main control unit of the limited publication process in the second embodiment is the extraction section 148.

B-4. Limited Update Process

A limited update process in the second embodiment is the same as "A-5. Limited update process" shown in FIG. 11. However, a main control unit of the limited update process in the second embodiment is the update section 149.

As described above, also in the second embodiment, the same effect as in the first embodiment can be obtained. In addition, according to the second embodiment described above, in the single head mounted display 100a (head mounted display device), the same service as in the information display system 1000 of the first embodiment can be provided to the user.

C. Modification Examples

In the embodiments described above, some of the configuration realized by hardware may be replaced with software, or some of the configuration realized by software may be replaced with hardware on the contrary. In addition, the following modification examples are also possible.

Modification Example 1

In the embodiments described above, the configuration of the information display system is illustrated. However, the configuration of the information display system can be arbitrarily set within a range not departing from the subject matter of the invention. For example, it is possible to add, delete, and convert the components.

For example, although the information display system is configured to include a head mounted display and a server, the relationship between the head mounted display and the server may be a many-to-one relationship or a many-to-many relationship. In addition, client apparatuses that receive the AR-SNS service may be various apparatuses other than the head mounted display. For example, client apparatuses that receive the AR-SNS service may be a personal computer, a smartphone, a mobile phone, a car navigation system, a personal digital assistant (PDA), and the like.

For example, functional sections such as the extraction section and the update section provided in the server are realized when the CPU loads a computer program, which is stored in the ROM or the hard disk, to the RAM and then executing the computer program. However, these functional sections may be formed using an application specific integrated circuit (ASIC) designed to realize the functions.

Modification Example 2

In the embodiments described above, the configuration of the head mounted display has been illustrated. However, the configuration of the head mounted display can be arbitrarily set within a range not departing from the subject matter of the invention. For example, it is possible to add, delete, and convert each component.

In the embodiments described above, allocation of components to the control unit and the image display unit is only an example, and it is possible to adopt various forms. For example, it is possible to adopt the following forms.

(i) Form in which a control unit has processing functions of a CPU, a memory, and the like and an image display unit has only a display function (ii) Form in which each of a control unit and an image display unit has processing functions of a CPU, a memory, and the like (iii) Form in which a control unit and an image display unit are integrated (for example, a form in which a control unit is included in an image display unit so as to function as a glasses type wearable computer)

(iv) Form in which a smartphone or a portable game machine is used instead of a control unit (v) Form in which a control unit and an image display unit are configured so as to be able to perform wireless communication and receive electric power wirelessly, thereby eliminating a connection section (cord)

In the embodiments described above, the control unit includes the transmission section and the image display unit includes the receiving section for convenience of explanation. However, both the transmission section and the receiving section of the embodiments described above have a two-way communication function, and accordingly can function as a transceiver section. In addition, for example, the control unit shown in FIG. 5 is connected to the image display unit through a cable signal transmission path. However, the control unit and the image display unit may also be connected to each other through a wireless signal transmission path, such as a wireless LAN, infrared communication, or Bluetooth (registered trademark).

For example, the configuration of the control unit and the image display unit shown in FIG. 5 can be changed arbitrarily. Specifically, for example, a touch pad may be omitted from the control unit so that an operation using only the cross key is possible. In addition, the control unit may be configured to include other interfaces for operation, such as a stick for operation. In addition, the control unit may be configured to be connectable to devices, such as a keyboard and a mouse, so that an input from the keyboard or the mouse is received. In addition, for example, an operation input using a foot switch (switch operated by the foot of the user) may be acquired in addition to the operation input using a touch pad or a cross key. For example, it is possible to provide a visual line detector, such as an infrared sensor, in the image display unit and then detect the line of sight of the user and acquire an operation input based on command matched with the movement of the line of sight. For example, it is possible to detect the gesture of the user using a camera and acquire an operation input based on the command matched with the gesture. When detecting the gesture, the fingertip of the user, a ring placed on the finger of the user, or a medical instrument in the hand of the user may be a mark for movement detection. If the operation input using a foot switch or the line of sight can be acquired, an input information acquisition section can acquire the operation input from the user even in the work in which it is difficult for the user to release the hand.

For example, although the head mounted display is a binocular transmissive head mounted display, the head mounted display may also be a monocular head mounted display. In addition, the head mounted display may be formed as a non-transmissive head mounted display that blocks the transmission of the outside scene in a state where the user wears the head mounted display.

Figure 14A:
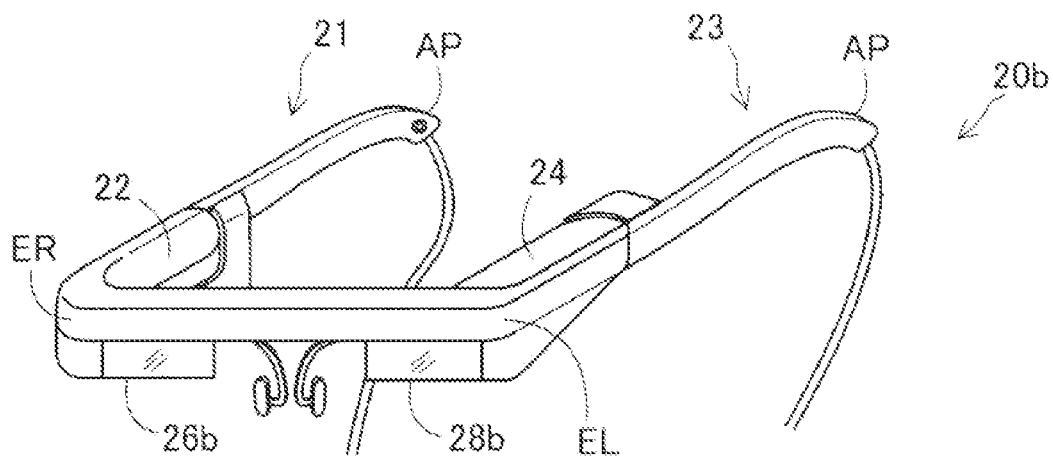
FIGS. 14A and 14B are explanatory views showing the configuration of the appearance of a head mounted display in a modification example.
Figure 14B:
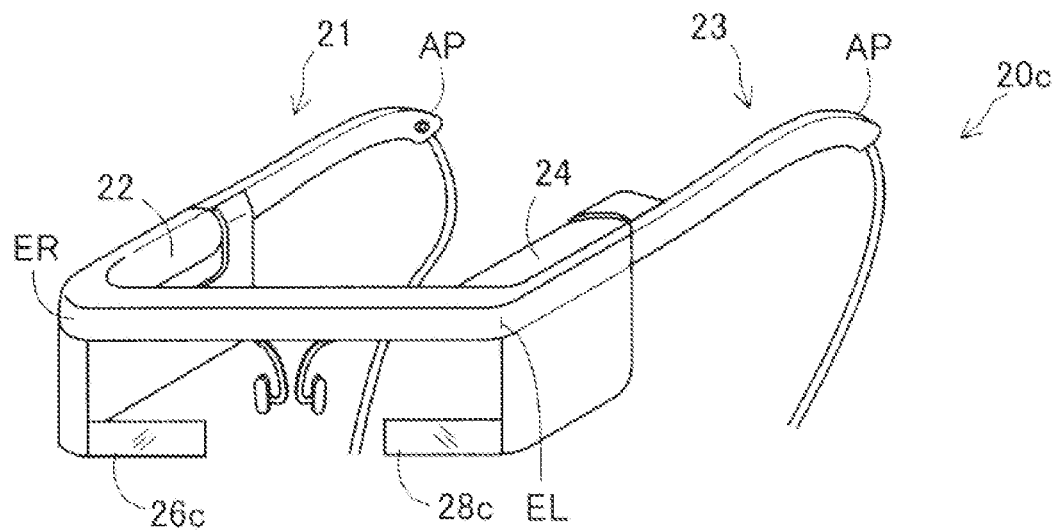

FIGS. 14A and 14B are explanatory views showing the configuration of the appearance of a head mounted display in a modification example. In the case of an example shown in FIG. 14A, the difference from the head mounted display 100 shown in FIG. 1 is that an image display unit 20b includes a right optical image display section 26b instead of the right optical image display section 26 and includes a left optical image display section 28b instead of the left optical image display section 28. The right optical image display section 26b is formed so as to be smaller than the optical member of the first embodiment, and is disposed diagonally above the right eye of the user when the user wears the head mounted display. Similarly, the left optical image display section 28b is formed so as to be smaller than the optical member of the first embodiment, and is disposed diagonally above the left eye of the user when the user wears the head mounted display. In the case of an example shown in FIG. 14B, the difference from the head mounted display 100 shown in FIG. 1 is that an image display unit 20c includes a right optical image display section 26c instead of the right optical image display section 26 and includes a left optical image display section 28c instead of the left optical image display section 28. The right optical image display section 26c is formed so as to be smaller than the optical element of the first embodiment, and is disposed diagonally below the right eye of the user when the user wears the head mounted display. The left optical image display section 28c is formed so as to be smaller than the optical element of the first embodiment, and is disposed diagonally below the left eye of the user when the user wears the head mounted display. Thus, the optical image display section is preferably disposed in the vicinity of the eyes of the user. In addition, the size of the optical member that forms the optical image display section may also be set arbitrarily, and it is possible to realize a head mounted display in a form in which the optical image display section covers only a part of the eyes of the user. In other words, it is possible to realize a head mounted display in a form in which the optical image display section does not cover the eyes of the user completely.

For example, functional sections, such as the image processing section, the display control section, the tag acquisition section, the information generating section, the update request section, the extraction section, the update section, and the audio processing section are realized when the CPU loads a computer program, which is stored in the ROM or the hard disk, to the RAM and then executing the computer program. However, these functional sections may be formed using an application specific integrated circuit (ASIC) designed to realize the functions.

For example, although the head mounted display in which the image display unit is mounted like glasses is adopted in the embodiments described above, the image display unit may be a normal flat display unit (for example, a liquid crystal display device, a plasma display device, or an organic EL display device). Also in this case, the connection between the control unit and the image display unit may be a connection through the signal transmission path of a cable or may be a connection through the wireless signal transmission path. In this manner, the control unit can also be used as a remote control of the normal flat display device.

In addition, as the image display unit, instead of the image display unit mounted like glasses, image display units of other shapes, such as an image display unit that is mounted like a hat, may be adopted. In addition, as the earphone, an ear-hook type earphone or a headband type earphone may be adopted, or the earphone may be omitted. In addition, for example, a head-up display (HUD) mounted in a vehicle, such as an automobile or an airplane, may be adopted. In addition, for example, a head mounted display built in the body armor, such as a helmet, may be adopted.

For example, although the secondary battery is used as a power supply in the embodiments described above, various batteries can be used as power supplies without being limited to the secondary battery. For example, it is also possible to use a primary battery, a fuel cell, a solar cell, and a thermal battery.

For example, in the embodiments described above, the image light generating section is formed using a backlight, a backlight control section, an LCD, and an LCD control section. However, the above-described form is only an example. The image light generating section may include components for realizing other methods together with the above components or instead of the above components. For example, the image light generating section may be configured to include an organic electro-luminescence (organic EL) display and an organic EL control section. In addition, for example, a digital micromirror device can be used as the image light generating section instead of the LCD. In addition, the invention can also be applied to a laser retina projection type head mounted display device, for example.

Modification Example 3

In the embodiments described above, examples of the tag table (target information storage section) and the update condition table (update permission condition storage section) are shown. However, details of these tables are only an example, and various modifications are possible. For example, it is possible to add, delete, and change the field. In addition, these tables may be normalized by being divided into a plurality of tables. In addition, the "field" means a database field (basic unit when inputting data into the record).

For example, although the extraction permission conditions are stored in the tag table so as to match a tag in a one-to-one relationship, the extraction permission conditions may also be stored so as to be associated with a plurality of tags.

For example, other fields excluding the fields shown in FIG. 2 may be included in the tag table. For example, an "application" field indicating the application of a tag may be included. In addition, it is also possible to set new extraction permission conditions using an application field.

For example, other fields excluding the fields shown in FIG. 3 may be included in the update condition table. For example, a "device type" field specifying the type of a device for which a tag table can be updated may be included.

The content of the extraction permission conditions illustrated in FIG. 2 and the content of the update permission conditions illustrated in FIG. 3 are only an example, and various modifications are possible. As the "conditions specifying a user for whom publication of a tag is allowed" of the extraction permission conditions, for example, conditions of "when the height of the user exceeds a predetermined threshold value" may be used. In this case, the head mounted display is configured to include an altimeter, and the head mounted display can transmit the measured value of the altimeter together with a tag acquisition request in step S102 of the limited publication process (FIG. 7). In this manner, it is possible to change the display of a tag according to the height of the user. In addition, it can be estimated whether the user is an adult or a child from the height of the user. In addition, for example, conditions of "when the pulse, temperature, or the like of the user exceeds a predetermined threshold value" may be used. In this case, the head mounted display is configured to include a pulsimeter or a thermometer, and the head mounted display can transmit the measured value of the pulsimeter or the thermometer together with a tag acquisition request in step S102 of the limited publication process (FIG. 7). In this manner, it is possible to change the display of a tag according to the health condition of the user.

Modification Example 4

In the embodiments described above, an example of the user information is shown. However, user information can be changed in various ways. For example, some items may be omitted, or other items may be added.

For example, although a password is used as authentication information, various kinds of information including a signature, fingerprint reading information used for fingerprint authentication, vein reading information used for palm vein authentication, voiceprint reading information used for voiceprint authentication, retina reading information used for retina authentication, a digital certificate, and a one-time password can be used as the authentication information.

Modification Example 5

In the embodiment described above (FIG. 7), an example of the limited publication process is shown. However, the procedure of the above-described limited publication process is only an example, and various modifications are possible. For example, some steps may be omitted, or other steps may be added. In addition, it is also possible to change the order of steps executed.

For example, in the limited publication process, the AR-SNS service based on a pass-through method of extracting a tag from the current position information and the azimuth information of the head mounted display has been described as an example. However, also in a method based on image recognition in which a tag is extracted by performing image recognition of an image in a direction of the field of view of the user of the head mounted display, the limited publication process can be performed. In this case, the extraction section of the server receives an image in the direction of the user of the field of view instead of the current position information and the azimuth information, and extracts a tag from the tag table on the basis of the received image in the direction of the field of view. Then, the extraction section can perform the same processing using the extraction permission conditions matched with the extracted tag.

For example, in step S110, the information generating section of the head mounted display may change the color of the icon, which is generated in the procedure c2 of the procedures c1 to c4 for generating information for additional presentation, according to the degree of importance of the tag or the agreement number of the tag.

In step S112, an example of the method in which the information generating section generates the information for additional presentation has been mentioned. However, the above-described method (method of changing the position and size of each tag in information for additional presentation on the basis of the current position information D1 and the azimuth information D2 of the user) is only an example, and various modifications are possible. For example, a camera that captures an outside scene (external view) in a direction of the field of view of the user and acquires an outside scene image is provided in the image display unit. The information generating section may determine the tag arrangement position and the tag size by performing image recognition of the outside scene image acquired by the camera. In this case, for example, the information generating section may perform image recognition of a door or a gate of a building and arrange a tag at a position superimposed on the door or the gate or a position in the vicinity of the door or the gate. In addition, for example, the information generating section may perform image recognition of a road sign or a signboard of a store and arrange a tag at a position superimposed on the road sign or the signboard or a position in the vicinity of the road sign or the signboard. In addition, for example, the information generating section may perform image recognition of a boundary between a mountain or a building and the sky and arrange a tag at a position in the vicinity of the boundary.

For example, the image display unit or the control unit is configured to include a wireless communication interface that enables short-range wireless communication or medium-range wireless communication. This wireless communication interface reads information stored in a short-range wireless communication chip or a medium-range wireless communication chip that is built in the outside gate, door, arch, or the like. In step S112, the information generating section may change the presence or absence of tag display, tag position, tag size, and the like in the information for additional presentation according to the result read through the wireless communication interface. In this case, if the owner of the outside gate, door, arch, or the like (hereinafter, simply referred to as an "owner") does not want to publish the tag, the owner may store the intention in the tag. If the owner wants to publish the tag in a limited way, the owner may store the intention in the tag. That is, it is possible to limit the public availability of a tag easily by the intention of the owner.

Modification Example 6

In the embodiments described above, an example of the limited update process is shown. However, the procedure of the above-described limited update process is only an example, and various modifications are possible. For example, some steps may be omitted, or other steps may be added. In addition, it is also possible to change the order of steps executed.

For example, the processing result transmission step of step S210 and the processing result display step of step S212 may be omitted.

For example, in the limited update process of the embodiments described above, processing of notifying the user of the head mounted display of the location where a tag cannot be written (location where the update permission conditions of the update condition table are set as "not allowed") is not mentioned. However, a server may notify the user of the head mounted display that the user has entered a location where a tag cannot be written or that a location where a tag cannot be written is close including the direction and the like, on the basis of the current position information of the head mounted display. The notification form may be a tag display, or may be a voice guide.

Modification Example 7

The invention is not limited to the embodiments and modification examples described above, and various configurations can be realized within a range not departing from the scope. For example, the technical features in the embodiments, examples, and modification examples corresponding to the technical features in each aspect written in "Summary" may be appropriately replaced or combined in order to solve some or all of the problems described above or in order to achieve some or all of the effects described above. In addition, the technical features may be appropriately removed unless the technical features are described as essential things in this specification.

The entire disclosure of Japanese Patent Application No. 2013-059623, filed Mar. 22, 2013 is expressly incorporated by reference herein.

What is claimed is:

1. An information display system, comprising:
an information apparatus; and
a head mounted display device that enables a user to view a virtual image,
wherein the information apparatus includes:
a target information table that stores:
target information to be published by the information apparatus,
extraction permission conditions, which are conditions when extracting the target information, so as to match the target information, and
order information for determining a display order of the target information so as to match the target information, the order information specifying, for each piece of target information included in the target information table, a respective agreement number that represents a number of users that have agreed with the piece of target information; and at least one of a processor that executes one or more programs and an application specific integrated circuit ("ASIC") to realize one or more functions of:
an extraction section that extracts:
the order information from the target information table, and
the target information from the target information table when user information that is information regarding the user of the head mounted display device satisfies the extraction permission conditions; and
a communication unit that transmits the extracted target information and the extracted order information to the head mounted display device,
wherein the head mounted display device includes:
at least one of an additional processor that executes one or more programs and an additional application specific integrated circuit ("ASIC") to realize one or more functions of:
an information acquisition section that transmits the user information to the information apparatus and acquires the target information from the information apparatus; and
an information generating section that generates information for additional presentation for providing augmented reality to the user using the acquired target information; and
an optical image display that enables the user to view the generated information for additional presentation as the virtual image, and
wherein, when a plurality of pieces of the target information satisfying the extraction permission conditions are received, the information generating section of the head mounted display device generates the information for additional presentation by placing each of the plurality of pieces of target information respectively in a separate layer of a plurality of superimposed layers according to the order information.

2. The information display system according to claim 1, wherein at least one of an account name set by the user, authentication information set by the user, an e-mail address of the user, a network address of the head mounted display device, a MAC address of the head mounted display device, an account name provided from a provider of a service used by the user, and authentication information provided from the provider of the service used by the user is included in the user information.

3. The information display system according to claim 1, wherein
the information apparatus further includes an update condition table that stores update permission conditions for allowing updating of the target information table,
the at least one of the processor and the ASIC included in the information apparatus further realize one or more functions of an update section that, when received information that has been received from the head mounted display device satisfies the update permission conditions, updates the target information table using the received information, and
the at least one of the additional processor and the additional ASIC included in the head mounted display device further realizes one or more functions of an update request section that transmits information for updating the target information table to the information apparatus.

4. The information display system according to claim 3, wherein, in the information apparatus, limited area information specifying a limited area to limit updating of the target information table is stored in the update condition table of the information apparatus so as to match the update permission conditions, and the update section acquires the limited area information corresponding to current position information of the head mounted display device, which is included in the received information, and updates the target information table using the received information when the received information satisfies the update permission conditions matched with the acquired limited area information, and
the update request section of the head mounted display device transmits the current position information indicating a current position of the head mounted display device together with information for updating the target information table.

5. The information display system according to claim 3, wherein at least one of conditions specifying the user for whom updating of the target information table is allowed, conditions specifying update date and time of the target information table, and conditions indicating that updating of the target information table is not allowed is included in the update permission conditions.

6. The information display system according to claim 1, wherein the extraction permission conditions specify a time period associated with the target information.

7. The information display system according to claim 6, wherein the time period specified by the extraction permission conditions includes at least one of a date, a date range, a date frequency, and a time range.

8. An information display method using an information apparatus and a head mounted display device that enables a user to view a virtual image, comprising:
(a) making the head mounted display device transmit user information, which is information regarding the user of the head mounted display device, to the information apparatus;
(b) making the information apparatus extract from a target information table:
target information, which is to be published by the information apparatus, when the received user information satisfies extraction permission conditions, which are conditions when extracting the target information, so as to match the target information, and
order information for determining a display order of the target information so as to match the target information, the order information specifying, for each piece of target information included in the target information table, a respective agreement number that represents a number of users that have agreed with the piece of target information;
(c) making the information apparatus transmit the extracted target information and the extracted order information to the head mounted display device;
(d) making the head mounted display device acquire the target information from the information apparatus;
(e) generating information for additional presentation for providing augmented reality to the user using the acquired target information; and
(f) making the generated information for additional presentation be viewed as the virtual image by the user,
wherein, when a plurality of pieces of the target information satisfying the extraction permission conditions are received, the information for additional presentation is generated by placing each of the plurality of pieces of target information respectively in a separate layer of a plurality of superimposed layers according to the order information.

9. A head mounted display device that enables a user to view a virtual image, comprising:
at least one of a processor that executes one or more programs and an application specific integrated circuit ("ASIC") to realize one or more functions of:
an information acquisition section that acquires:
target information that is information extracted from a target information table when user information, which is information regarding the user of the head mounted display device, satisfies extraction permission conditions, which are conditions when extracting the target information, so as to match the target information, and
order information for determining a display order of the target information so as to match the target information, the order information specifying, for each piece of target information included in the target information table, a respective agreement number that represents a number of users that have agreed with the piece of target information; and
an information generating section that generates information for additional presentation for providing augmented reality to the user using the acquired target information; and
an optical image display that enables the user to view the generated information for additional presentation as the virtual image,
wherein, when a plurality of pieces of the target information satisfying the extraction permission conditions are received, the information generating section generates the information for additional presentation by placing each of the plurality of pieces of target information respectively in a separate layer of a plurality of superimposed layers according to the order information.

10. A head mounted display device that enables a user to view a virtual image, comprising:
a target information table that stores:
target information to be published by the head mounted display device,
extraction permission conditions, which are conditions when extracting the target information, so as to match the target information, and
order information for determining a display order of the target information so as to match the target information, the order information specifying, for each piece of target information included in the target information table, a respective agreement number that represents a number of users that have agreed with the piece of target information;
at least one of a processor that executes one or more programs and an application specific integrated circuit ("ASIC") to realize one or more functions of:
an extraction section that extracts:
the order information from the target information table, and
the target information from the target information table when user information that is information regarding the user satisfies the extraction permission conditions; and
an information generating section that generates information for additional presentation for providing augmented reality to the user using the extracted target information; and
an optical image display that enables the user to view the generated information for additional presentation as the virtual image,
wherein, when a plurality of pieces of the target information satisfying the extraction permission conditions are received, the information generating section generates the information for additional presentation by placing each of the plurality of pieces of target information respectively in a separate layer of a plurality of superimposed layers according to the order information.

* * * * *